United States Patent
Li et al.

(10) Patent No.: US 12,107,254 B2
(45) Date of Patent: Oct. 1, 2024

(54) LITHIUM ALLOY AS AN ANODE MATERIAL AND A PREPARATION METHOD THEREOF

(71) Applicant: University of Electronic Science and Technology of China, Chengdu (CN)

(72) Inventors: Jingze Li, Chengdu (CN); Weishang Jia, Chengdu (CN); Zeyu Yao, Chengdu (CN); Yuchi Liu, Chengdu (CN); Siji Qu, Chengdu (CN); Chao Li, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 633 days.

(21) Appl. No.: 16/955,064

(22) PCT Filed: Sep. 20, 2019

(86) PCT No.: PCT/CN2019/106821
§ 371 (c)(1),
(2) Date: Jun. 18, 2020

(87) PCT Pub. No.: WO2020/073785
PCT Pub. Date: Apr. 16, 2020

(65) Prior Publication Data
US 2020/0381705 A1  Dec. 3, 2020

(30) Foreign Application Priority Data
Oct. 8, 2018  (CN) .............................. 201811166961

(51) Int. Cl.
*H01M 4/04* (2006.01)
*C22C 1/02* (2006.01)
(Continued)

(52) U.S. Cl.
CPC ............. *H01M 4/0488* (2013.01); *C22C 1/02* (2013.01); *H01M 4/382* (2013.01); *H01M 4/405* (2013.01); *H01M 10/0525* (2013.01)

(58) Field of Classification Search
CPC ............... H01M 4/382; H01M 4/0488; H01M 10/0525; H01M 4/405; C22C 1/02
See application file for complete search history.

(56) References Cited

U.S. PATENT DOCUMENTS 3,551,184 A * 12/1970 Dremann ................ C23C 26/00
118/77
5,278,005 A *  1/1994 Yamauchi ............... H01M 4/40
429/231.9
(Continued)

FOREIGN PATENT DOCUMENTS

CN          103290293 A  *  9/2013  ............. C22C 24/00

OTHER PUBLICATIONS

Machine translation of CN 103290293 A (Year: 2013).*
(Continued)

*Primary Examiner* — Matthew T Martin
*Assistant Examiner* — Jessie Walls-Murray
(74) *Attorney, Agent, or Firm* — Bayramoglu Law Offices LLC

(57) ABSTRACT

A method for preparing a lithium alloy as an anode material includes the following steps: heating lithium metal into a molten state in an environment with a dew point not higher than −50° C. and an oxygen content not higher than 10 ppm; adding a transition metal to the molten lithium metal, maintaining the temperature for 5-15 minutes, and uniformly mixing to form a molten alloy; cooling the molten alloy to room temperature to obtain the lithium alloy as the anode material. The preparation method of the present invention is simple and feasible with less cost. The prepared
(Continued)

lithium alloy as the anode material can effectively improve the coulombic efficiency and cycle lifespan of the lithium battery.

13 Claims, 17 Drawing Sheets

(51) Int. Cl.
*H01M 4/38* (2006.01)
*H01M 4/40* (2006.01)
*H01M 10/0525* (2010.01)

(56) References Cited

U.S. PATENT DOCUMENTS

| | | | | |
|---|---|---|---|---|
| 5,804,335 | A * | 9/1998 | Kamauchi | H01M 4/40 429/231.95 |
| 2006/0076719 | A1* | 4/2006 | Yamamoto | C22C 1/0441 266/207 |
| 2013/0084238 | A1* | 4/2013 | Park | C01G 3/10 423/604 |
| 2017/0133662 | A1* | 5/2017 | Cui | H01M 4/134 |
| 2020/0321579 | A1* | 10/2020 | Song | H01M 4/38 |

OTHER PUBLICATIONS

FISAIR "Low Dew Point Humidity Control for Battery Production", Fisair Air Humidity Control, <https://fisair.com/wp-content/uploads/2018/09/CCDFLOW-18-1-EN.pdf> (Year: 2018).*

Dst, "Almost all moisture is removed in the production of lithium batteries", <https://www.dst-sg.com/the-dew-point/almost-all-moisture-is-removed-in-the-production-of-lithium-batteries/> (Year: 2018).*

Ken Soleyn, GE Infrastructure Sensing, "Dew Point Measurement In Metal Heat Treating", Heat Treating Processes pp. 54-61 (Year: 2005).*

Lusha Tian, Yongchun Guo, Jianping Li, Feng Xia, Minxian Liang and Yaping Bai; "Effects of Solidification Cooling Rate on the Microstructure and Mechanical Properties of a Cast Al—Si—Cu—Mg—Ni Piston Alloy"; Materials, 11, 1230; doi: 10.3390/ma11071230; www.mdpi.com/journal/materials (Year: 2018).*

Lu et al.; "Lithiophilic Cu—Ni core-shell nanowire network as a stable host for improving lithium anode performance", Energy Storage Materials, vol. 9, Oct. 2017, pp. 31-38, <https://doi.org/10.1016/j.ensm.2017.06.004> (Year: 2017).*

Balachandra et al.; "Surface grown copper nanowires for improved cooling efficiency", Cogent Engineering vol. 5, 2018—Issue 1, Article: 1512039, Published online: Sep. 16, 2018, <https://doi.org/10.1080/23311916.2018.1512039> (Year: 2018).*

Lu et al.; "Free-Standing Copper Nanowire Network Current Collector for Improving Lithium Anode Performance", ACS Publications, Nano Lett. 2016, 16, 7, 4431-4437, Publication Date: Jun. 2, 2016, <https://doi.org/10.1021/acs.nanolett.6b01581> (Year: 2016).*

Sang Yun Han, Matthew G. Boebinger, Neha P. Kondekar, Trevor J. Worthy, and Matthew T. McDowell; "Seeded Nanowire and Microwire Growth from Lithium Alloys"; Nano Letters 2018 18 (7), 4331-4337; DOI: 10.1021/acs.nanolett.8b01334; published Jun. 3, 2018, ACS Publications (Year: 2018).*

Jia et al., "Low-temperature fusion fabrication of Li—Cu alloy anode with in situ formed 3D framework of inert LiCux nanowires for excellent Li storage performance", Science Bulletin vol. 65, Issue 22, pp. 1907-1915 https://doi.org/10.1016/j.scib.2020.07.012 (Year: 2020).*

* cited by examiner

LITHIUM ALLOY AS AN ANODE MATERIAL AND A PREPARATION METHOD THEREOF

CROSS REFERENCE TO THE RELATED APPLICATIONS

This application is the national phase entry of International Application No. PCT/CN2019/106821, filed on Sep. 20, 2019, which is based upon and claims priority to Chinese Patent Application No. 201811166961.4, filed on Oct. 8, 2018, the entire contents of which are incorporated herein by reference.

TECHNICAL FIELD

The present invention belongs to the technical field of battery anode materials. More particularly, the present invention relates to a lithium alloy as an anode material and a preparation method thereof.

BACKGROUND

Lithium metal has the ultrahigh theoretical specific capacity and the lowest oxidation-reduction potential of known materials, and thus may be used as an anode material to match the demand on improving energy density in lithium batteries. Research on the modification of lithium metal for anodes, therefore, has been an area of concentration in the field of lithium batteries. However, the application of lithium metal as anodes has been constrained due to the high activity, large volume variation, and lithium dendrites of the lithium metal. Currently, there exist the following issues when lithium metal is used as anodes in lithium batteries. (1) Lithium metal is highly reactive and thus is prone to reacting with the electrolyte irreversibly, as a result, the electrolyte and the lithium metal are consumed, which diminishes the capacity of the anode as well as the cycle lifespan of the battery. (2) During charging and discharging of a battery, the battery significantly expands and contracts due to a large volume variation of the lithium metal. (3) In the deposition of lithium metal, it is prone to forming lithium dendrites due to kinetic and thermodynamic effects, which not only causes the formation of dead lithium, reduces the capacity of the anode, and increases polarization of the battery, but may also cause an internal short circuit that results in battery failure, or even a fire or explosion. In this regard, numerous studies are dedicated to the modification of lithium metal as anodes in terms of electrolytes, separators, surface modification, etc., in order to improve the performance and cycling lifetime of lithium secondary batteries and inhibit lithium dendrite growth. These processes, however, are complicated and thus are difficult to be widely applied. A method for effectively inhibiting lithium dendrite growth has not been developed in the prior art.

SUMMARY

For the above-mentioned issues in the prior art, the present invention provides a lithium alloy as an anode material and a preparation method thereof, which can effectively solve the problems such as low coulombic efficiency and short cycling lifetime caused by lithium dendrite growth during the operation process of batteries when using lithium metal as the anode material.

To achieve the above-mentioned objectives, the present invention adopts the following technical solutions to solve the above-mentioned technical problems.

A method for preparing a lithium alloy as an anode material includes the following steps:

(1) heating lithium metal to a temperature of 200° C.-800° C. in an environment with a dew point not higher than −50° C. and an oxygen content not higher than 10 ppm to obtain a molten lithium metal; wherein the environment is configured to prevent the lithium metal from reacting with moisture or oxygen in the air;

(2) adding a transition metal to the molten lithium metal at a temperature lower than the melting point of the transition metal, maintaining the temperature for 5-15 minutes, and uniformly mixing to form a molten alloy; wherein the transition metal is at least one selected from the group consisting of copper, nickel, scandium, titanium, vanadium, chromium, manganese, cobalt, and niobium; the lithium metal is melted at the temperature lower than the melting point of the transition metal; after the transition metal is added to the molten lithium metal, the lithium metal acts as a cosolvent, so that the lithium metal and the transition metal can be well melted and mixed when the temperature is lower than the melting point of the transition metal; when the melting temperature of the lithium metal is relatively high, the lithium metal and the transition metal can rapidly form the molten alloy; when the melting temperature is properly reduced, the lithium metal and the transition metal can form the molten alloy as well; in the present invention, the lithium metal and the transition metal can be melted and mixed to form the molten alloy at the temperature of 200° C.-800° C.; and (3) cooling the molten alloy obtained in step (2) to room temperature to obtain the lithium alloy as the anode material.

During the cooling process of the molten alloy, both the transition metal and the lithium metal are presented in forms of elementary substances, and a uniform transition metal network structure is formed inside the lithium alloy. Such an alloy structure can be used as a battery anode material to effectively improve the performance of the battery.

Further, in step (1), the lithium metal is heated to 500° C. in the environment with the dew point of −55° C. and the oxygen content of 5 ppm.

Further, an atomic ratio of the transition metal to the lithium metal is 1:100-2:3.

Further, the atomic ratio of the transition metal to the lithium metal is 1:60.

Further, the transition metal is copper.

Further, in step (3), the molten alloy obtained in step (2) is cooled to room temperature within 5 minutes.

The preparation principle of the present invention is as follows. The lithium metal is heated to become a molten lithium metal, and then a transition metal is added to the molten lithium metal. The lithium metal acts as a cosolvent, so that the lithium metal and the transition metal can be well melted and mixed when the temperature is lower than the melting point of the transition metal. At this time, the mixture is in a molten alloy state. On a microscopic scale, the lithium atoms and the transition metal atoms are uniformly mixed. During reducing the temperature to room temperature, the transition metal such as the elementary substance of copper forms copper nanowires, and the elementary substance of lithium is filled within the copper nanowires, so the transition metal and the lithium metal are mixed as well.

The lithium alloy as the anode material and the preparation method thereof in the present invention have the following advantages.

(1) The transition metal employed in the present invention and lithium metal are not subjected to electrochemical reaction. The molten lithium metal has a better chemical affinity with the transition metal material. The lithium metal and transition metal can form a molten alloy within a predetermined ratio and temperature range to achieve uniform mixing of the two kinds of metal atoms. The lithium metal has a changed internal microstructure after being alloyed, which makes it easier to prepare an ultra-thin lithium alloy anode strip.

(2) After the lithium metal is alloyed, the electrochemical activity is not reduced compared to that of the lithium metal, and a metal conductive three-dimensional skeleton structure is formed in situ. The dissolution and deposition of the lithium metal during the charge and discharge cycle would not cause a volume variation of the anode material but reduce the actual current density, thereby reducing the polarization of the battery.

(3) The preparation method of the present invention is simple and feasible with less cost than prior art methods. The obtained lithium alloy as the anode material can effectively improve the coulombic efficiency and cycle lifespan of the lithium battery.

(4) When the lithium alloy as the anode material prepared by the present invention is used in a lithium secondary battery, the cathode material can use conventional cathode materials for lithium ion batteries, organic cathode materials, sulfur cathode materials, air/oxygen cathode materials, and the like without additionally preparing special cathode materials.

(5) The lithium alloy as the anode material prepared by the present invention can effectively inhibit lithium dendrite growth. Taking the lithium-copper alloy as an example, the lithium-copper alloy has a copper nanowire network structure inside. When the lithium-copper alloy is used as the anode material, during the discharge process of the battery, the lithium metal inside the lithium-copper alloy is dissolved and consumed, and the copper nanowire conductive network structure inside the lithium-copper alloy is exposed. During the charge process of the battery, the cathode material is delithiated, and lithium ions are electroplated and deposited on the anode material. The copper nanowire conductive network of the lithium-copper alloy can be used as a conductive three-dimensional current collector for lithium ion plating and deposition, which reduces the actual current density and inhibits lithium dendrite growth (the growth rate of lithium dendrites is proportional to the current density). Moreover, lithium ions are electroplated and deposited inside the copper nanowire conductive network structure, which limits lithium dendrites. The copper nanowire network provides sufficient space for lithium deposition, and also inhibits changes in battery volume during the deposition and dissolution of lithium metal.

BRIEF DESCRIPTION OF THE DRAWINGS

FIG. 1-1 and FIG. 1-2 show scanning electron microscope (SEM) images of the lithium-copper alloy CuLi100; wherein, FIG. 1-1 is an SEM image showing a surface of the lithium-copper alloy CuLi100; and FIG. 1-2 is an SEM image showing a cross section of the lithium-copper alloy CuLi100.

FIG. 2-1 and FIG. 2-2 show SEM images of the lithium-copper alloy CuLi60 prepared in embodiment 4; wherein, FIG. 2-1 is an SEM image showing a surface of the lithium-copper alloy CuLi60; and FIG. 2-2 is an SEM image showing a cross section of the lithium-copper alloy CuLi60.

FIG. 3-1 and FIG. 3-2 show SEM images of the lithium-copper alloy Cu2Li3; wherein, FIG. 3-1 is an SEM image showing a surface of the lithium-copper alloy Cu2Li3; and FIG. 3-2 is an SEM image showing a cross section of the lithium-copper alloy Cu2Li3.

FIG. 4-1, FIG. 4-2, FIG. 4-3 and FIG. 4-4 show SEM images of the lithium-copper alloy CuLi80; wherein, FIG. 4-1 and FIG. 4-2 are SEM images showing a surface of the lithium-copper alloy CuLi80; and FIG. 4-3 and FIG. 4-4 are SEM images showing a cross section of the lithium-copper alloy CuLi80.

FIG. 5-1, FIG. 5-2, FIG. 5-3 and FIG. 5-4 show SEM images of the lithium-copper alloy CuLi40; wherein, FIG. 5-1 and FIG. 5-2 are SEM images showing a surface of the lithium-copper alloy CuLi40; and FIG. 5-3 and FIG. 5-4 are SEM images showing a cross section of the lithium-copper alloy CuLi40.

FIG. 6-1 and FIG. 6-2 show SEM images of the lithium-copper alloy CuLi20; wherein, FIG. 6-1 is an SEM image showing a surface of the lithium-copper alloy CuLi20; and FIG. 6-2 is an SEM image showing a cross section of the lithium-copper alloy CuLi20.

FIG. 7-1 and FIG. 7-2 show SEM images of the lithium-copper alloy CuLi12.

FIG. 8-1 and FIG. 8-2 show SEM images of the lithium-copper alloy CuLi10; wherein, FIG. 8-1 is an SEM image showing a surface of the lithium-copper alloy CuLi10; and FIG. 8-2 is an SEM image showing a cross section of the lithium-copper alloy CuLi10.

FIG. 9-1 and FIG. 9-2 show SEM images of the lithium-copper alloy CuLi6.

FIG. 10-1 and FIG. 10-2 show SEM images of the lithium-copper alloy CuLi3; wherein, FIG. 10-1 is an SEM image showing a surface of the lithium-copper alloy CuLi3; and FIG. 10-2 is an SEM image showing a cross section of the lithium-copper alloy CuLi3.

FIG. 11-1 and FIG. 11-2 show SEM images of the lithium-copper alloy Cu2Li3 after Li is removed; wherein, FIG. 11-1 is an SEM image showing a surface of the lithium-copper alloy Cu2Li3 after Li is removed; and FIG. 11-2 is an SEM image showing a cross section of the lithium-copper alloy Cu2Li3 after Li is removed.

FIG. 12-1 and FIG. 12-2 show SEM images of the lithium-copper alloy CuLi60 after Li is removed; wherein, FIG. 12-1 is an SEM image showing a surface of the lithium-copper CuLi60 after Li is removed; and FIG. 12-2 is an SEM image showing a cross section of the lithium-copper alloy CuLi60 after Li is removed.

DETAILED DESCRIPTION OF THE EMBODIMENTS

Embodiment 1

Figure 1:
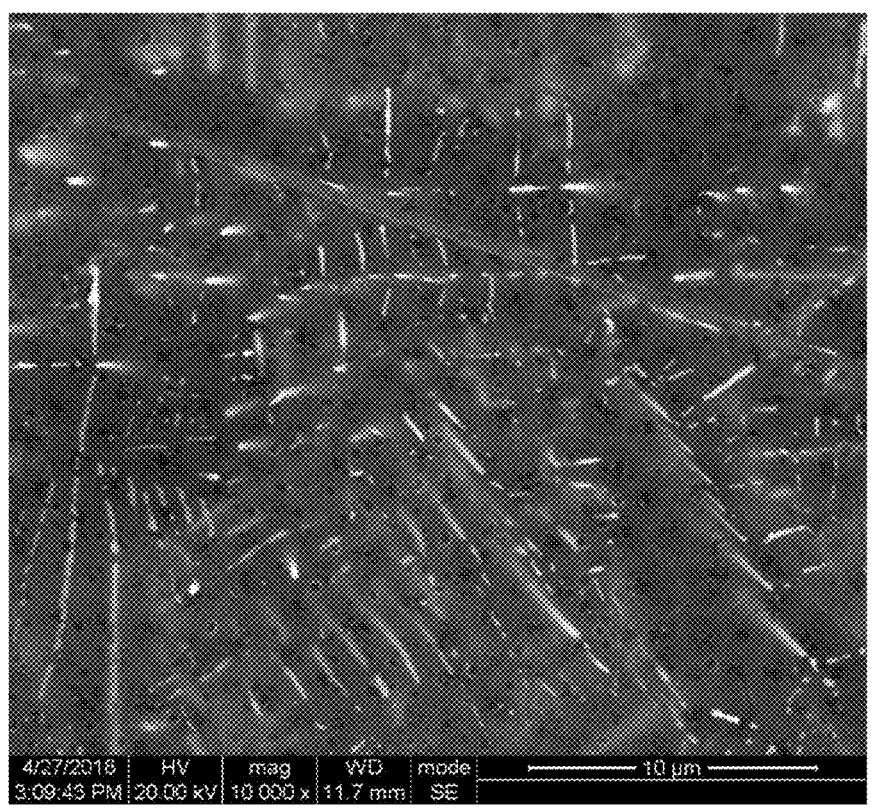

A method for preparing a lithium alloy as an anode material includes the following steps.

(1) Lithium metal is heated to a temperature of 200° C. in an environment with a dew point of −50° C. and an oxygen content of 10 ppm to obtain a molten lithium metal.

(2) The transition metal copper is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of copper to lithium is 1:100.

(3) The molten lithium alloy obtained in step (2) is cooled to room temperature within 5 minutes to obtain the lithium-copper alloy CuLi100 as the anode material.

Embodiment 2

A method for preparing a lithium alloy as an anode material includes the following steps.

(1) Lithium metal is heated to a temperature of 200° C. in an environment with a dew point of −60° C. and an oxygen content of 2 ppm to obtain a molten lithium metal. (2) The transition metal copper is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of copper to lithium is 1:60.

(3) The molten lithium alloy obtained in step (2) is cooled to room temperature within 5 minutes to obtain the lithium-copper alloy CuLi60 as the anode material.

Embodiment 3

A method for preparing a lithium alloy as an anode material includes the following steps.

(1) Lithium metal is heated to a temperature of 800° C. in an environment with a dew point of −70° C. and an oxygen content of 1 ppm to obtain a molten lithium metal.

(2) The transition metal copper is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of copper to lithium is 2:3.

(3) The molten lithium alloy obtained in step (2) is cooled to room temperature within 5 minutes to obtain the lithium-copper alloy Cu2Li3 as the anode material.

Embodiment 4

A method for preparing a lithium alloy as an anode material includes the following steps.

(1) Lithium metal is heated to a temperature of 500° C. in an environment with a dew point of −55° C. and an oxygen content of 5 ppm to obtain a molten lithium metal.

(2) The transition metal copper is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of copper to lithium is 1:60.

(3) The molten lithium alloy obtained in step (2) is cooled to room temperature within 5 minutes to obtain the lithium-copper alloy CuLi60 as the anode material.

Embodiment 5

A method for preparing a lithium alloy as an anode material includes the following steps.

(1) Lithium metal is heated to a temperature of 300° C. in an environment with a dew point of −55° C. and an oxygen content of 5 ppm to obtain a molten lithium metal.

(2) The transition metal copper is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of copper to lithium is 1:80.

(3) The molten lithium alloy obtained in step (2) is cooled to room temperature within 5 minutes to obtain the lithium-copper alloy CuLi80 as the anode material.

Embodiment 6

A method for preparing a lithium alloy as an anode material includes the following steps.

(1) Lithium metal is heated to a temperature of 400° C. in an environment with a dew point of −55° C. and an oxygen content of 5 ppm to obtain a molten lithium metal.

(2) The transition metal copper is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of copper to lithium is 1:40.

(3) The molten lithium alloy obtained in step (2) is cooled to room temperature within 5 minutes to obtain the lithium-copper alloy CuLi40 as the anode material.

Embodiment 7

A method for preparing a lithium alloy as an anode material includes the following steps.

(1) Lithium metal is heated to a temperature of 600° C. in an environment with a dew point of −55° C. and an oxygen content of 5 ppm to obtain a molten lithium metal.

(2) The transition metal copper is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of copper to lithium is 1:20.

(3) The molten lithium alloy obtained in step (2) is cooled to room temperature within 5 minutes to obtain the lithium-copper alloy CuLi20 as the anode material.

Embodiment 8

A method for preparing a lithium alloy as an anode material includes the following steps.

(1) Lithium metal is heated to a temperature of 700° C. in an environment with a dew point of −55° C. and an oxygen content of 5 ppm to obtain a molten lithium metal.

(2) The transition metal copper is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of copper to lithium is 1:10.

(3) The molten lithium alloy obtained in step (2) is cooled to room temperature within 5 minutes to obtain the lithium-copper alloy CuLi10 as the anode material.

Embodiment 9

A method for preparing a lithium alloy as an anode material includes the following steps.

(1) Lithium metal is heated to a temperature of 800° C. in an environment with a dew point of −55° C. and an oxygen content of 5 ppm to obtain a molten lithium metal.

(2) The transition metal copper is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of copper to lithium is 1:5.

(3) The molten lithium alloy obtained in step (2) is cooled to room temperature within 5 minutes to obtain the lithium-copper alloy CuLi5 as the anode material.

Embodiment 10

In the present embodiment, the atomic ratio of copper to lithium is 1:12, and the rest of the process is the same as that of embodiment 4.

Embodiment 11

In the present embodiment, the atomic ratio of copper to lithium is 1:6, and the rest of the process is the same as that of embodiment 4.

Embodiment 12

In the present embodiment, the atomic ratio of copper to lithium is 1:3, and the rest of the process is the same as that of embodiment 4.

Embodiment 13

A method for preparing a lithium alloy as an anode material includes the following steps.

(1) Lithium metal is heated to a temperature of 200° C. in an environment with a dew point of −55° C. and an oxygen content of 5 ppm to obtain a molten lithium metal.

(2) The transition metal nickel is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of nickel to lithium is 1:100.

(3) The molten lithium alloy obtained in step (2) is cooled to room temperature within 5 minutes to obtain the lithium-nickel alloy NiLi100 as the anode material.

Embodiment 14

A method for preparing a lithium alloy as an anode material includes the following steps.

(1) Lithium metal is heated to a temperature of 300° C. in an environment with a dew point of −55° C. and an oxygen content of 5 ppm to obtain a molten lithium metal.

(2) The transition metal nickel is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of nickel to lithium is 1:80.

(3) The molten lithium alloy obtained in step (2) is cooled to room temperature within 5 minutes to obtain the lithium-nickel alloy NiLi80 as the anode material.

Embodiment 15

A method for preparing a lithium alloy as an anode material includes the following steps.

(1) Lithium metal is heated to a temperature of 400° C. in an environment with a dew point of −55° C. and an oxygen content of 5 ppm to obtain a molten lithium metal.

(2) The transition metal nickel is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of nickel to lithium is 1:60.

(3) The molten lithium alloy obtained in step (2) is cooled to room temperature within 5 minutes to obtain the lithium-nickel alloy NiLi60 as the anode material.

Embodiment 16

A method for preparing a lithium alloy as an anode material includes the following steps.

(1) Lithium metal is heated to a temperature of 500° C. in an environment with a dew point of −55° C. and an oxygen content of 5 ppm to obtain a molten lithium metal.

(2) The transition metal nickel is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of nickel to lithium is 1:40.

(3) The molten lithium alloy obtained in step (2) is cooled to room temperature within 5 minutes to obtain the lithium-nickel alloy NiLi40 as the anode material.

Embodiment 17

A method for preparing a lithium alloy as an anode material includes the following steps.

(1) Lithium metal is heated to a temperature of 600° C. in an environment with a dew point of −55° C. and an oxygen content of 5 ppm to obtain a molten lithium metal.

(2) The transition metal nickel is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of nickel to lithium is 1:20.

(3) The molten lithium alloy obtained in step (2) is cooled to room temperature within 5 minutes to obtain the lithium-nickel alloy NiLi20 as the anode material.

Embodiment 18

A method for preparing a lithium alloy as an anode material includes the following steps.

(1) Lithium metal is heated to a temperature of 700° C. in an environment with a dew point of −55° C. and an oxygen content of 5 ppm to obtain a molten lithium metal.

(2) The transition metal nickel is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of nickel to lithium is 1:10.

(3) The molten lithium alloy obtained in step (2) is cooled to room temperature within 5 minutes to obtain the lithium-nickel alloy NiLi10 as the anode material.

Embodiment 19

A method for preparing a lithium alloy as an anode material includes the following steps.

(1) Lithium metal is heated to a temperature of 800° C. in an environment with a dew point of −55° C. and an oxygen content of 5 ppm to obtain a molten lithium metal.

(2) The transition metal nickel is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of nickel to lithium is 1:5.

(3) The molten lithium alloy obtained in step (2) is cooled to room temperature within 5 minutes to obtain the lithium-nickel alloy NiLi5 as the anode material.

Embodiment 20

A method for preparing a lithium alloy as an anode material includes the following steps.

(1) Lithium metal is heated to a temperature of 500° C. in an environment with a dew point of −55° C. and an oxygen content of 5 ppm to obtain a molten lithium metal.

(2) The transition metal scandium is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of scandium to lithium is 1:100.

(3) The molten lithium alloy obtained in step (2) is cooled to room temperature within 5 minutes to obtain the lithium-scandium alloy ScLi100 as the anode material.

Embodiment 21

A method for preparing a lithium alloy as an anode material includes the following steps.

(1) Lithium metal is heated to a temperature of 500° C. in an environment with a dew point of −55° C. and an oxygen content of 5 ppm to obtain a molten lithium metal.

(2) The transition metal titanium is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of titanium to lithium is 1:100.

(3) The molten lithium alloy obtained in step (2) is cooled to room temperature within 5 minutes to obtain the lithium-titanium alloy TiLi100 as the anode material.

Embodiment 22

A method for preparing a lithium alloy as an anode material includes the following steps.

(1) Lithium metal is heated to a temperature of 500° C. in an environment with a dew point of −55° C. and an oxygen content of 5 ppm to obtain a molten lithium metal.

(2) The transition metal vanadium is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of vanadium to lithium is 1:100.

(3) The molten lithium alloy obtained in step (2) is cooled to room temperature within 5 minutes to obtain the lithium-vanadium alloy VLi100 as the anode material.

Embodiment 23

A method for preparing a lithium alloy as an anode material includes the following steps.

(1) Lithium metal is heated to a temperature of 500° C. in an environment with a dew point of −55° C. and an oxygen content of 5 ppm to obtain a molten lithium metal.

(2) The transition metal chromium is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of chromium to lithium is 1:100.

(3) The molten lithium alloy obtained in step (2) is cooled to room temperature within 5 minutes to obtain the lithium-chromium alloy CrLi100 as the anode material.

Embodiment 24

A method for preparing a lithium alloy as an anode material includes the following steps.

(1) Lithium metal is heated to a temperature of 500° C. in an environment with a dew point of −55° C. and an oxygen content of 5 ppm to obtain a molten lithium metal.

(2) The transition metal manganese is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of manganese to lithium is 1:100.

(3) The molten lithium alloy obtained in step (2) is cooled to room temperature within 5 minutes to obtain the lithium-manganese alloy MnLi100 as the anode material.

Embodiment 25

A method for preparing a lithium alloy as an anode material includes the following steps.

(1) Lithium metal is heated to a temperature of 500° C. in an environment with a dew point of −55° C. and an oxygen content of 5 ppm to obtain a molten lithium metal.

(2) The transition metal cobalt is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of cobalt to lithium is 1:100.

(3) The molten lithium alloy obtained in step (2) is cooled to room temperature within 5 minutes to obtain the lithium-cobalt alloy CoLi100 as the anode material.

Embodiment 26

A method for preparing a lithium alloy as an anode material includes the following steps.

(1) Lithium metal is heated to a temperature of 500° C. in an environment with a dew point of −55° C. and an oxygen content of 5 ppm to obtain a molten lithium metal.

(2) The transition metal niobium is added to the molten lithium metal at a temperature lower than the melting point of the transition metal, and the temperature is maintained for 10 minutes to obtain a metal solution. Then, the metal solution is uniformly mixed to form a molten lithium alloy. The atomic ratio of niobium to lithium is 1:100.

(3) The molten lithium alloy obtained in step (2) is cooled to room temperature within 5 minutes to obtain the lithium-niobium alloy NbLi100 as the anode material.

The morphologies of the lithium-copper alloys as the anode materials prepared by the present invention are observed, and FIG. 1-1, FIG. 1-2, FIG. 2-1, FIG. 2-2, FIG. 3-1, FIG. 3-2, FIG. 4-1, FIG. 4-2, FIG. 4-3, FIG. 4-4, FIG. 5-1, FIG. 5-2, FIG. 5-3, FIG. 5-4, FIG. 6-1, FIG. 6-2, FIG. 7-1, FIG. 7-2, FIG. 8-1, FIG. 8-2, FIG. 9-1, FIG. 9-2, FIG. 10-1, and FIG. 10-2 show the SEM images of some of the materials. The lithium metal is removed from the obtained anode materials by the reaction between lithium and water to obtain respective copper nanowire materials. FIG. 11-1, FIG. 11-2, FIG. 12-1, and FIG. 12-2 show the SEM images of some of the materials after lithium is removed.

As can be seen from FIG. 1-1, FIG. 1-2, FIG. 2-1, 2-2, FIG. 3-1, FIG. 3-2, FIG. 4-1, FIG. 4-2, FIG. 4-3, 4-4, FIG. 5-1, FIG. 5-2, FIG. 5-3, FIG. 5-4, FIG. 6-1, FIG. 6-2, FIG. 7-1, FIG. 7-2, FIG. 8-1, FIG. 8-2, FIG. 9-1, FIG. 9-2, FIG. 10-1, and FIG. 10-2, the higher the copper content, the higher the copper nanowire content, and the lower the relatively large copper particle content. As the copper content decreases, the copper particle content decreases, and the particles become finer. This shows that a change of the copper content significantly affects the morphology of the copper crystal. When the atomic ratio of copper to lithium is 1:60, the copper nanowires contained in the material are more dispersed, more uniform, and have more regular morphologies.

Figures 1, 2:
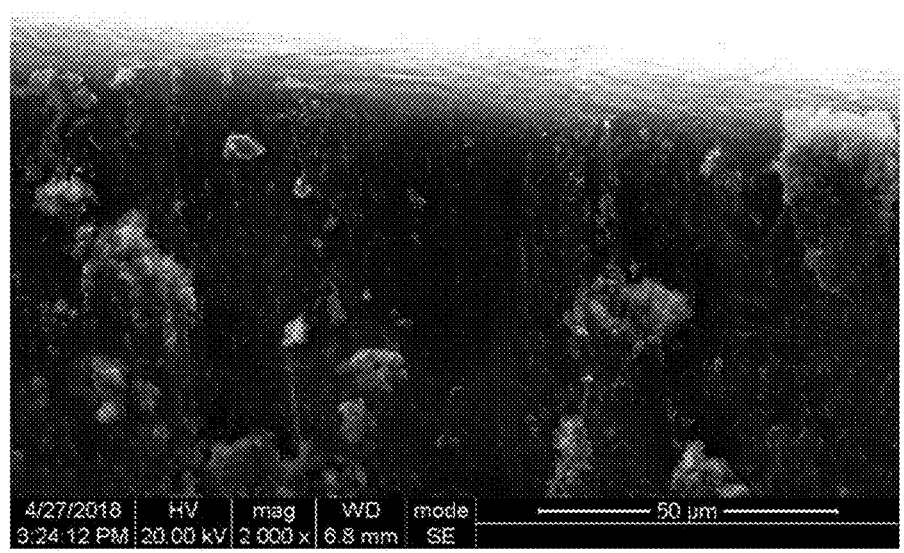
Figures 1, 2:
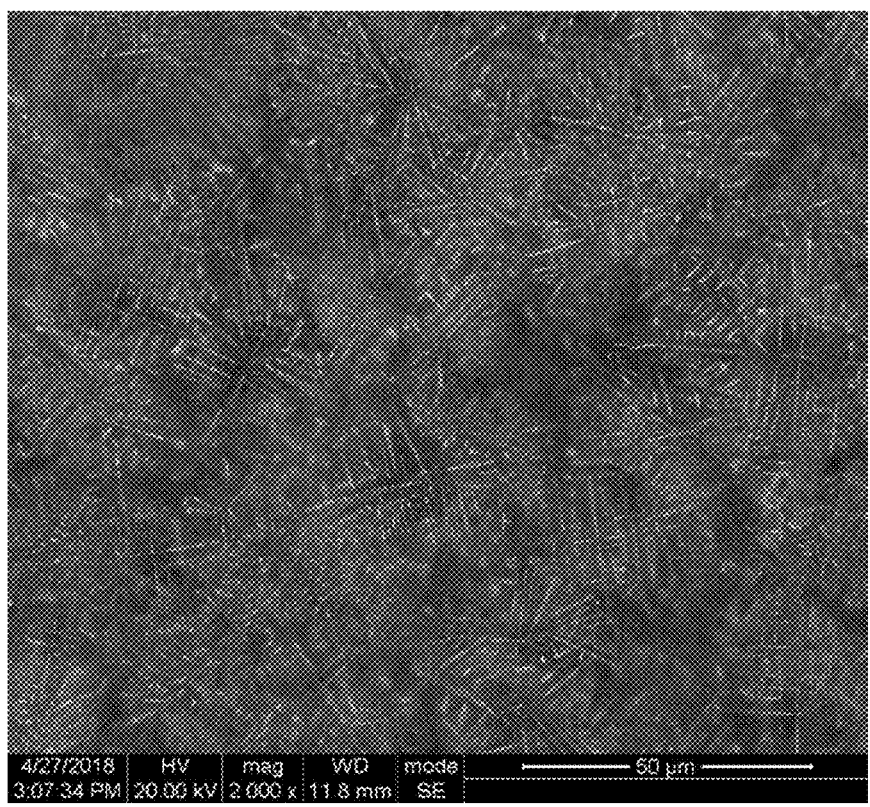
Figure 2:
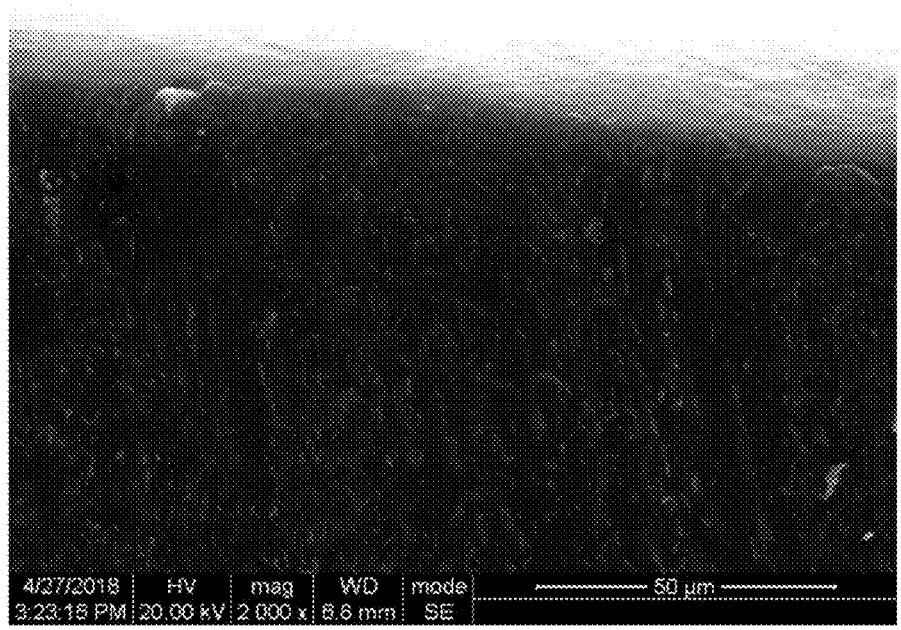
Figures 1, 3:
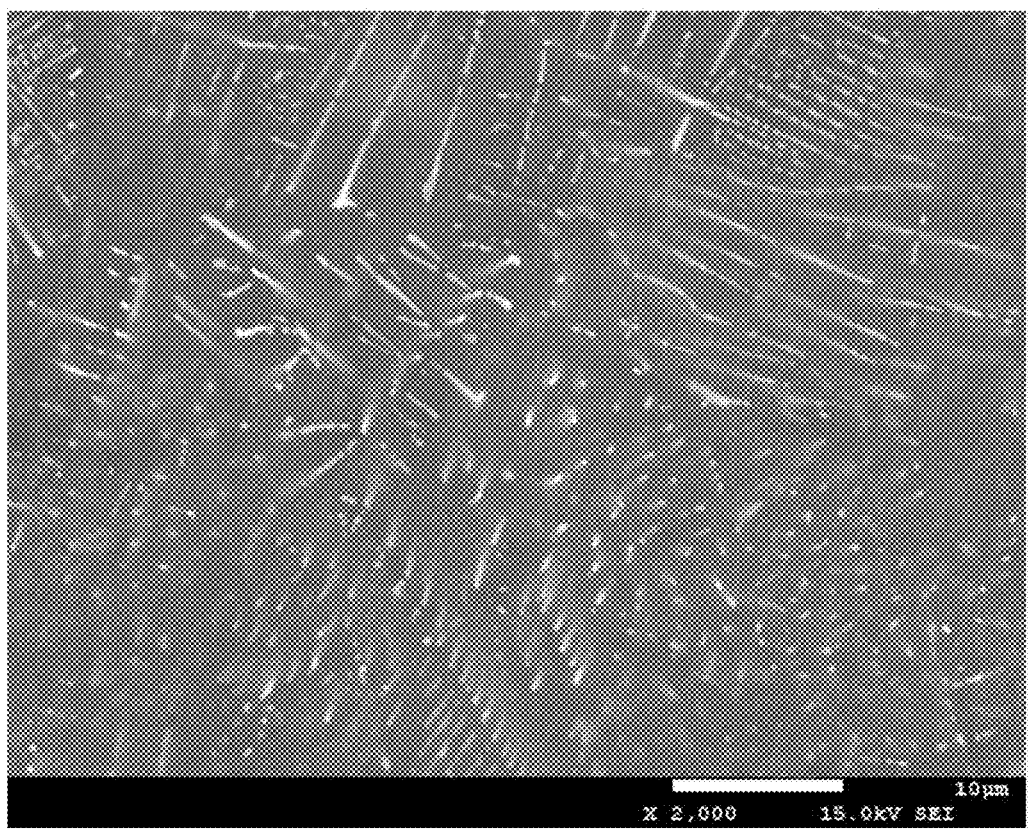
Figures 2, 3:
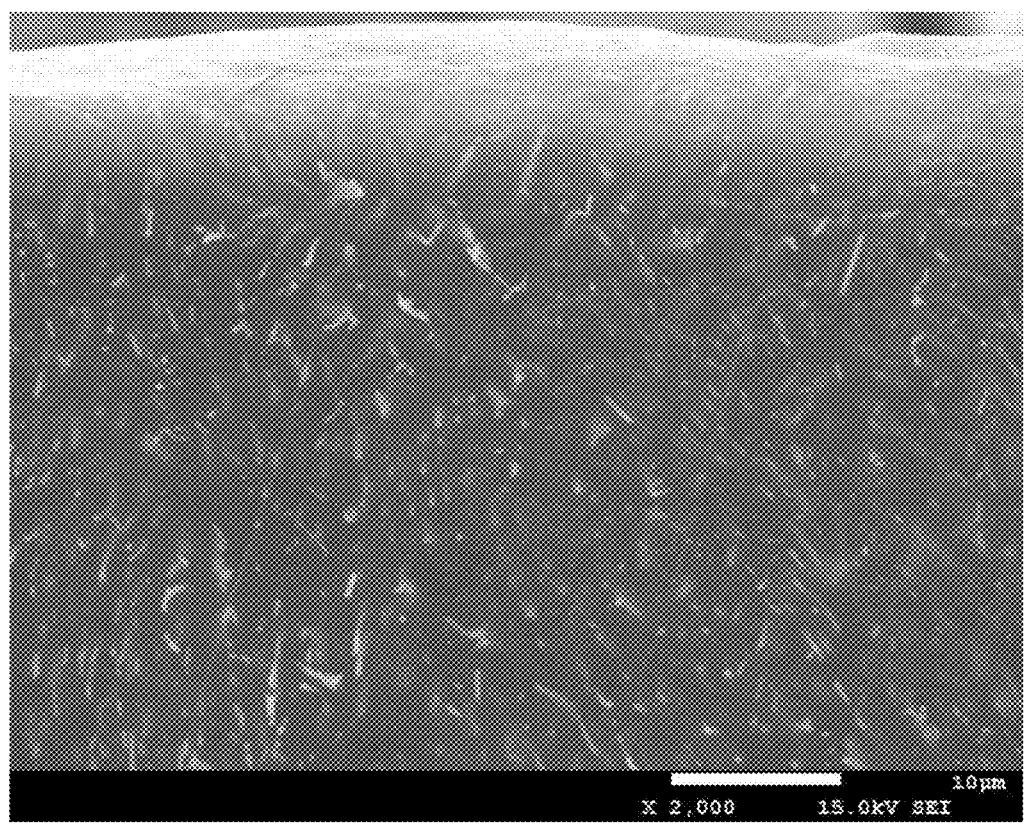
Figures 1, 4:
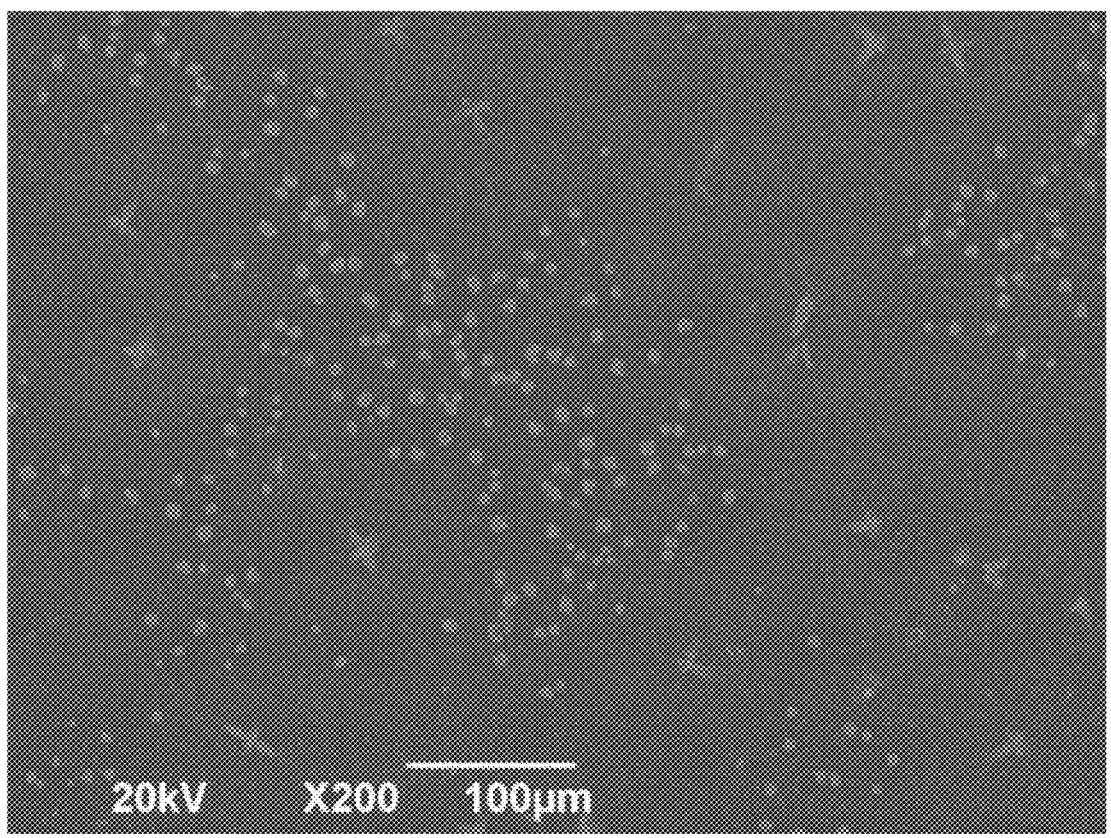
Figures 2, 4:
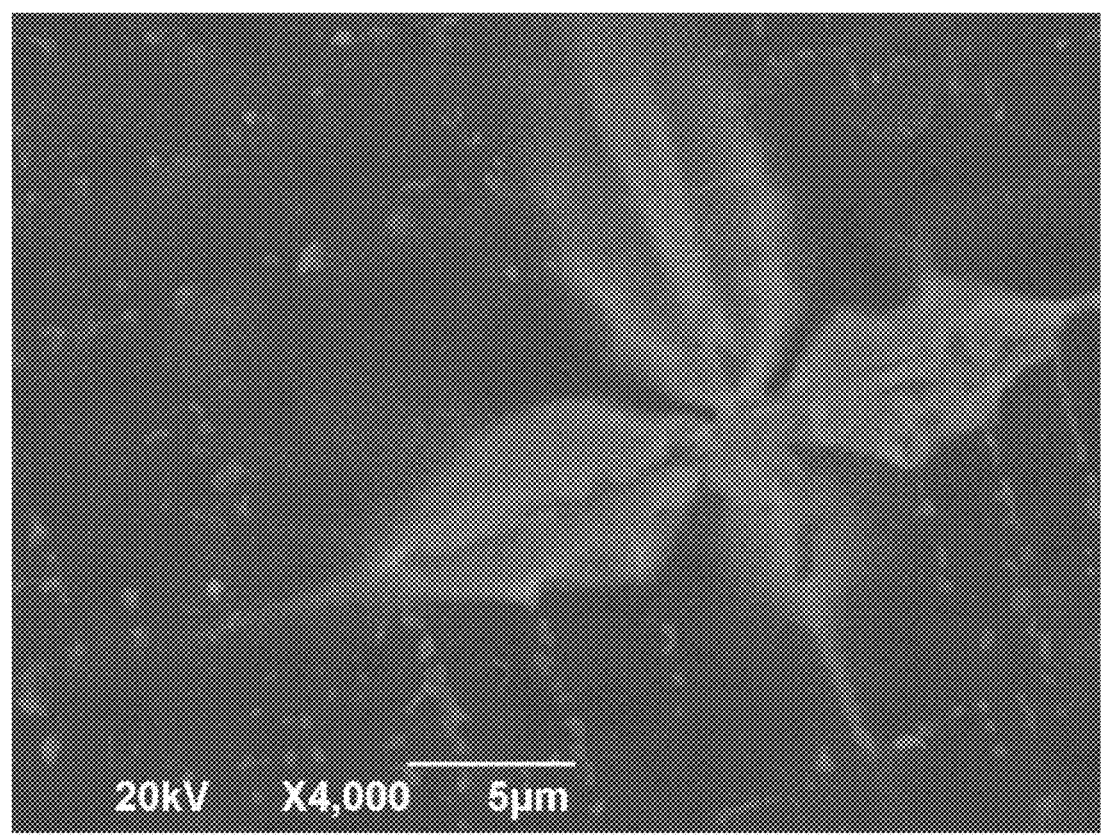
Figures 3, 4:
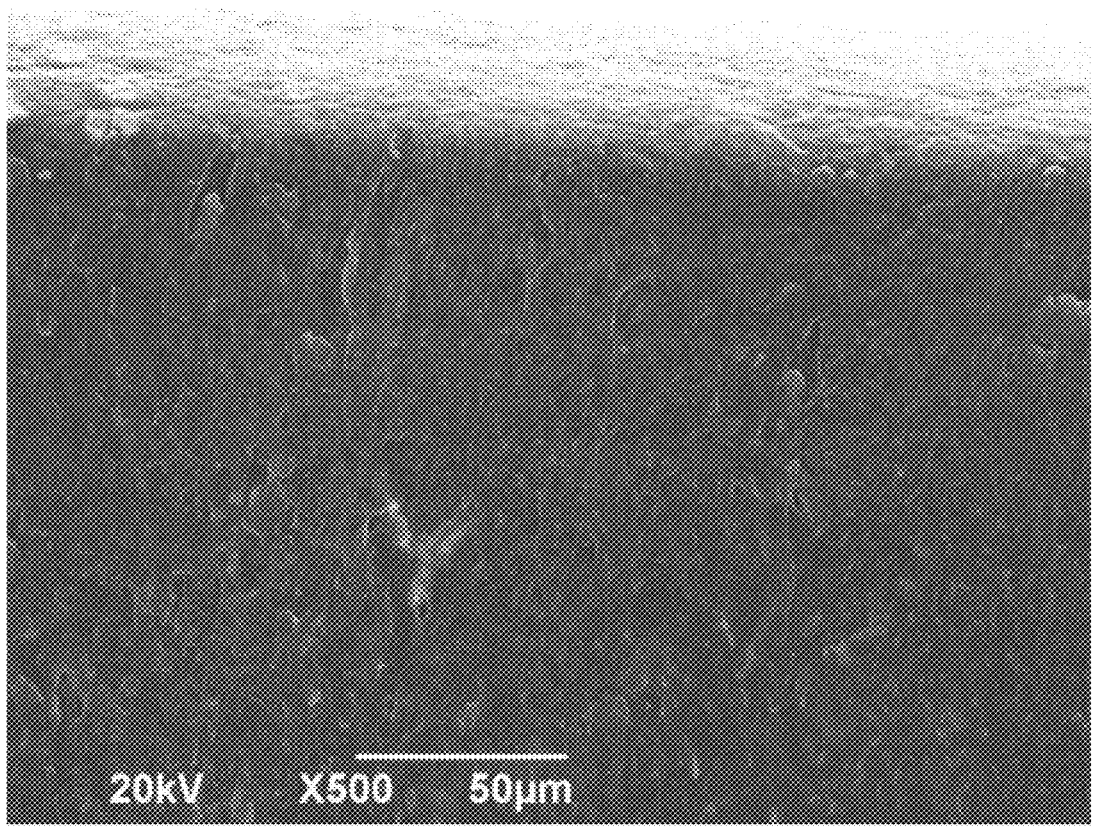
Figure 4:
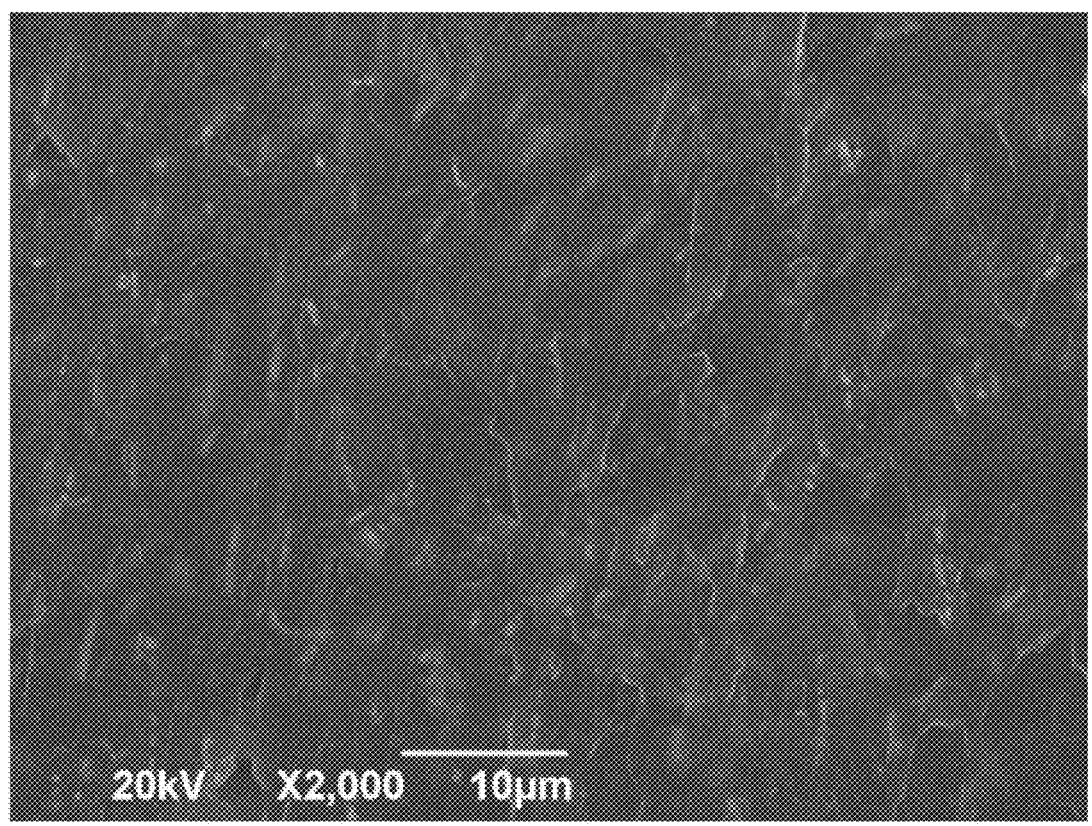
Figures 1, 5:
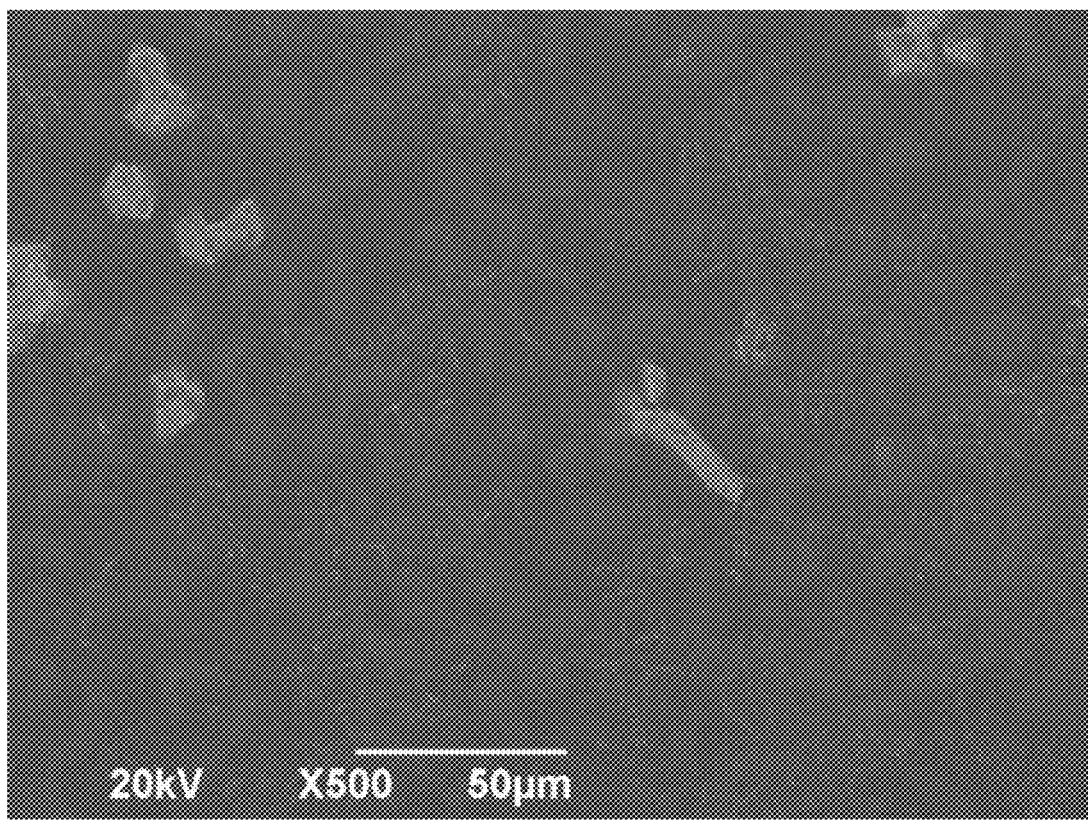
Figures 2, 5:
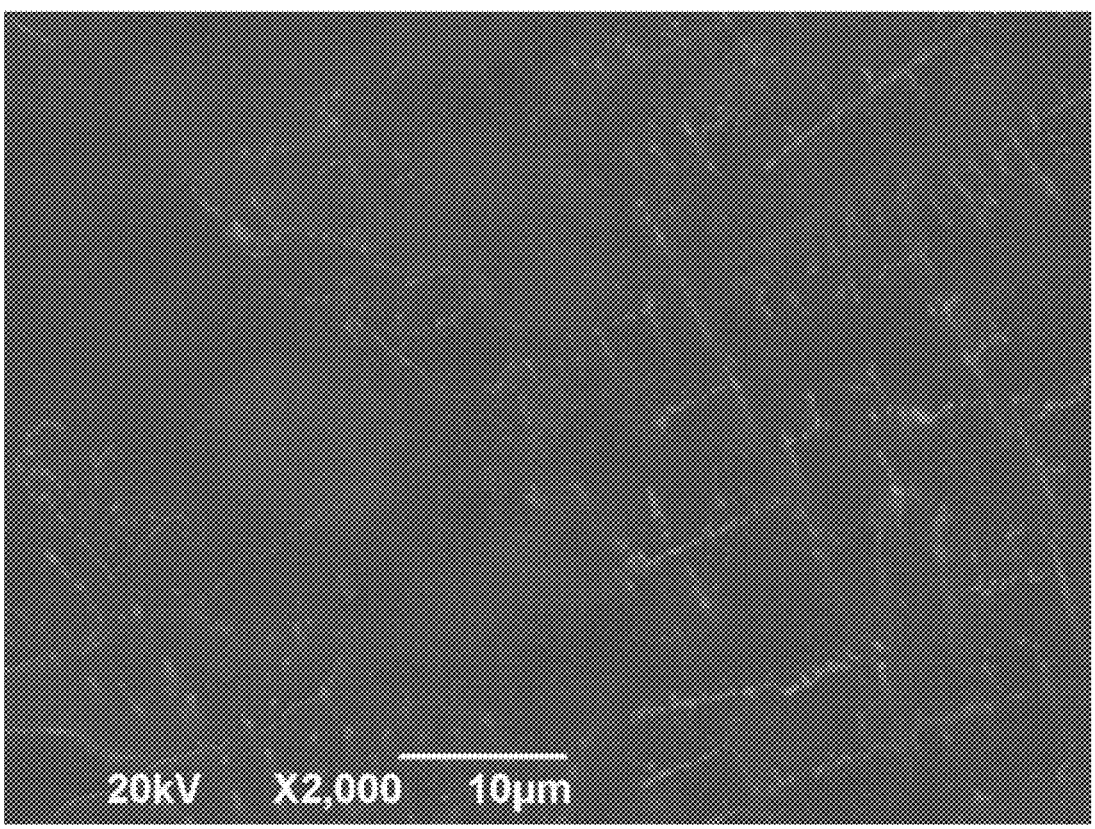
Figures 3, 5:
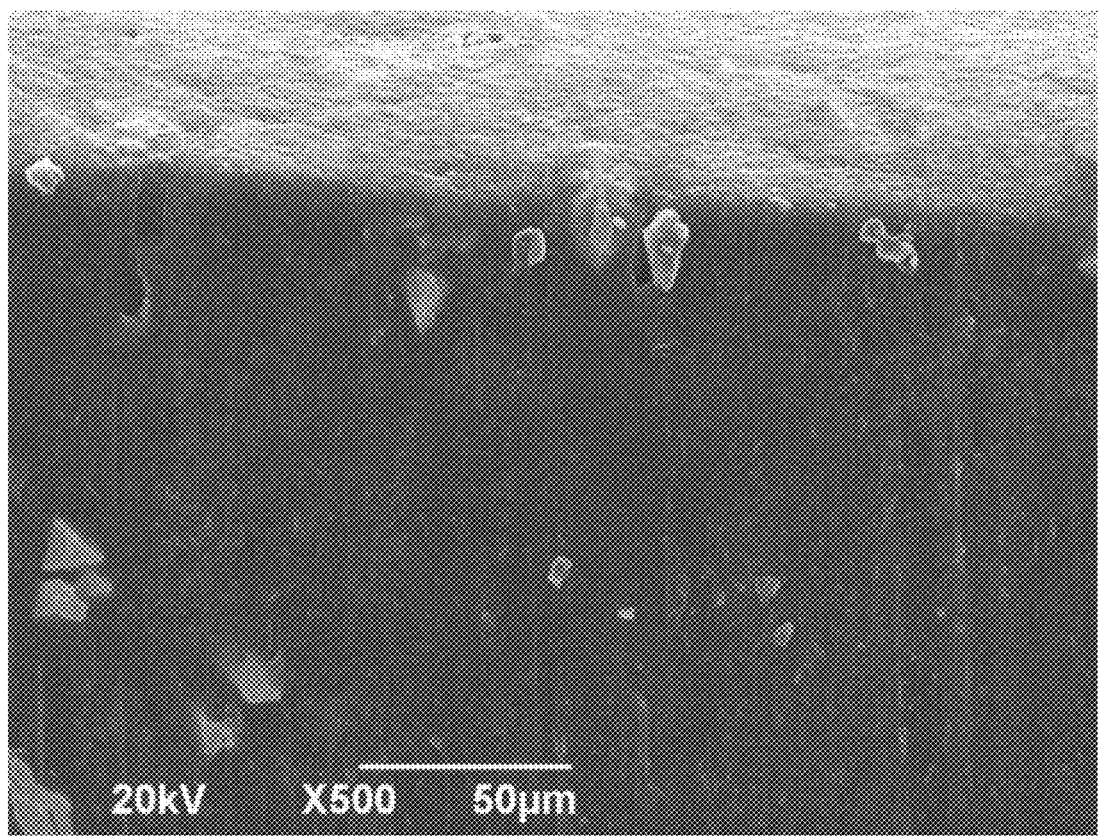
Figures 4, 5:
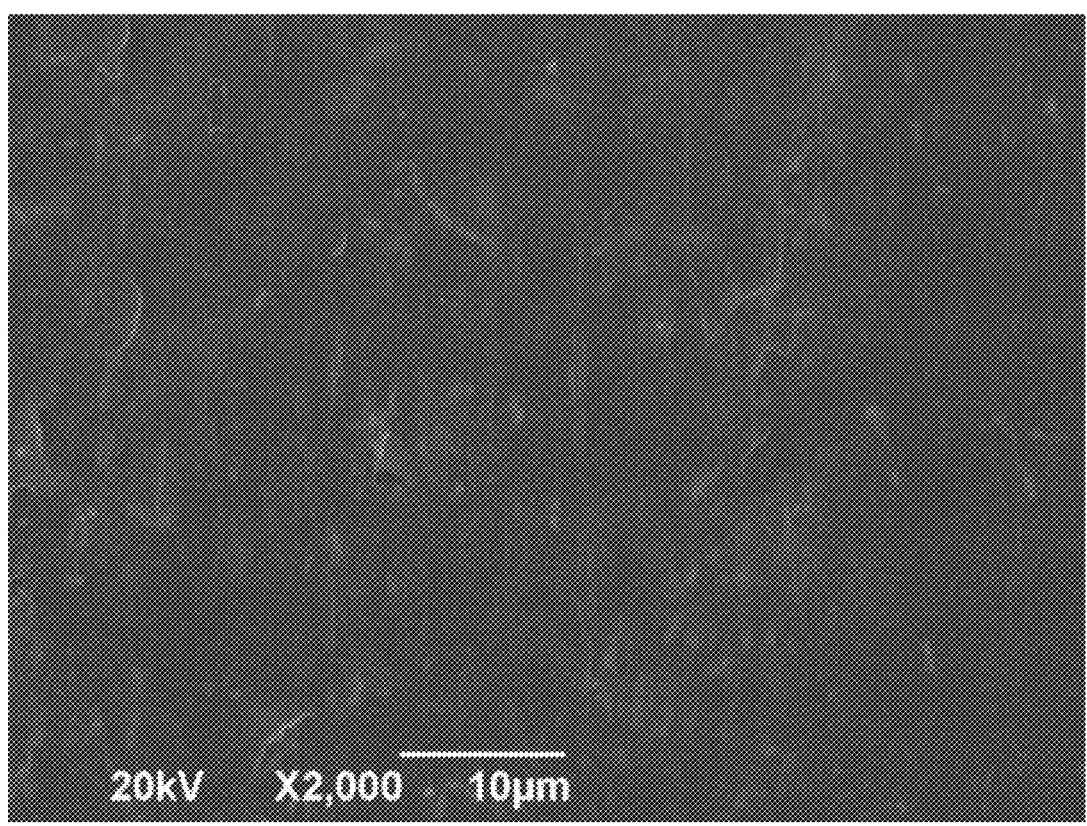
Figures 1, 6:
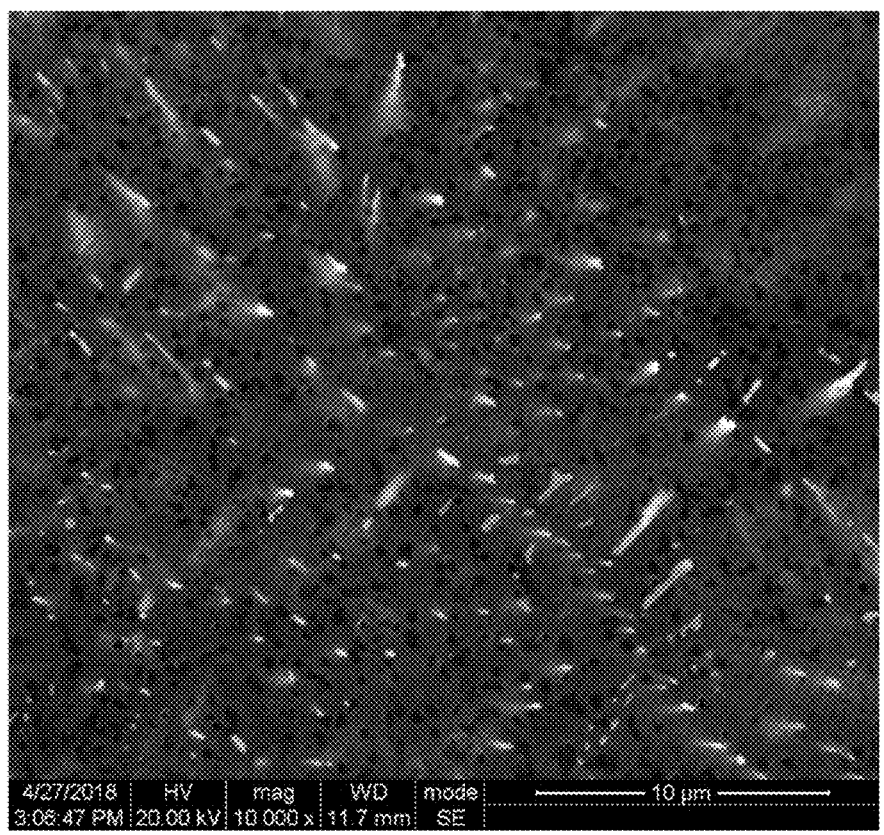
Figures 2, 6:
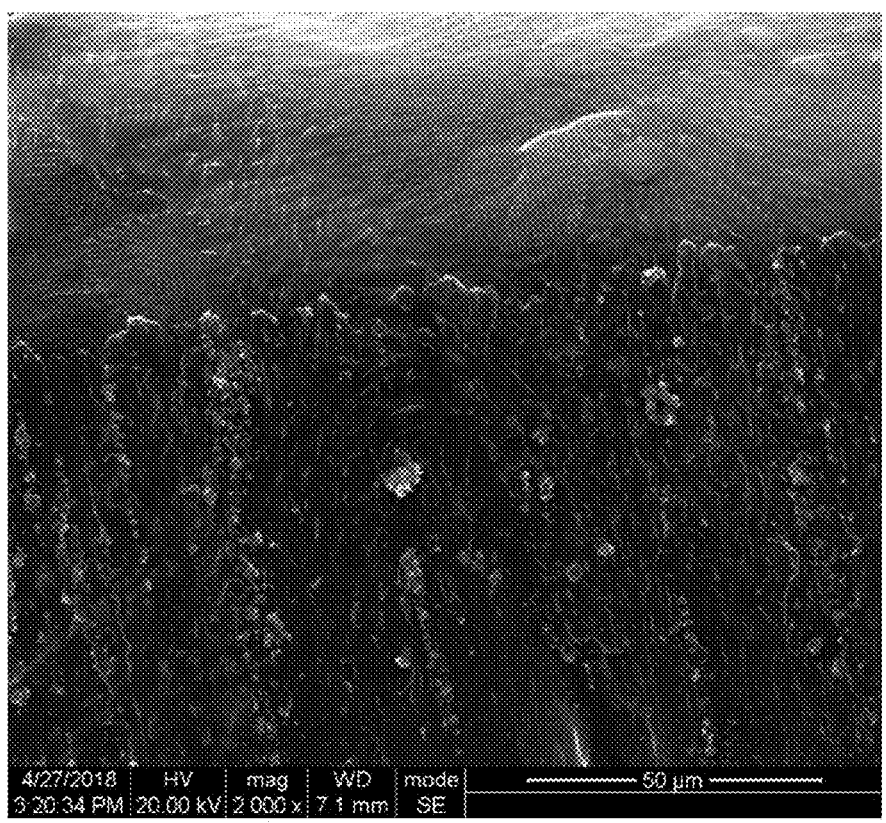
Figures 1, 7:
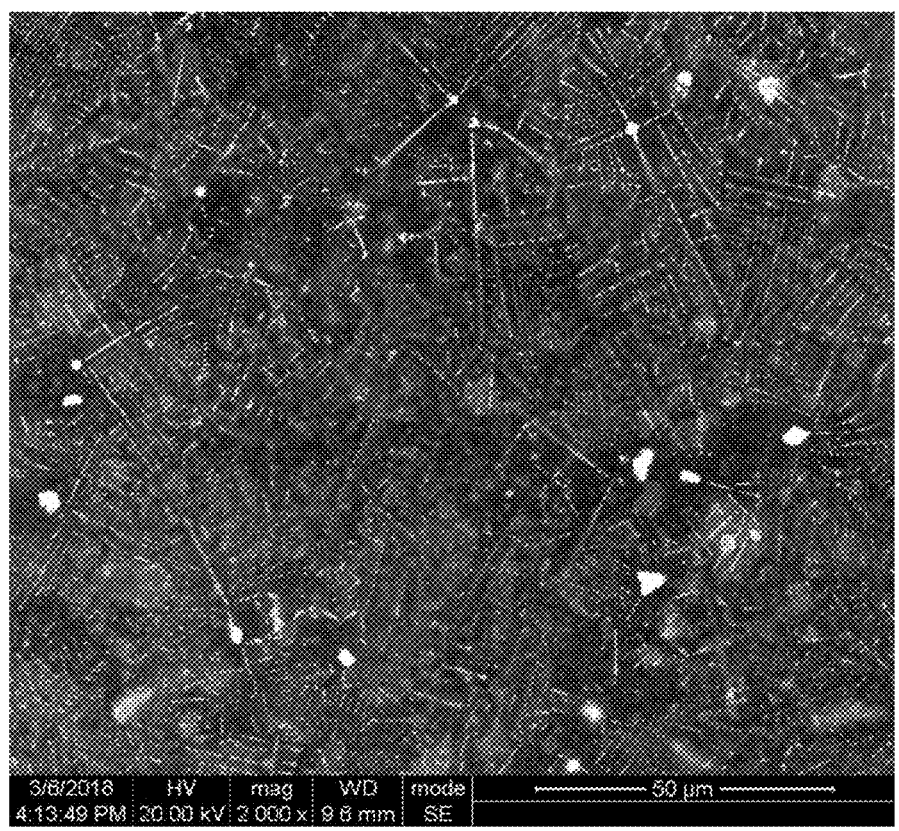
Figures 2, 7:
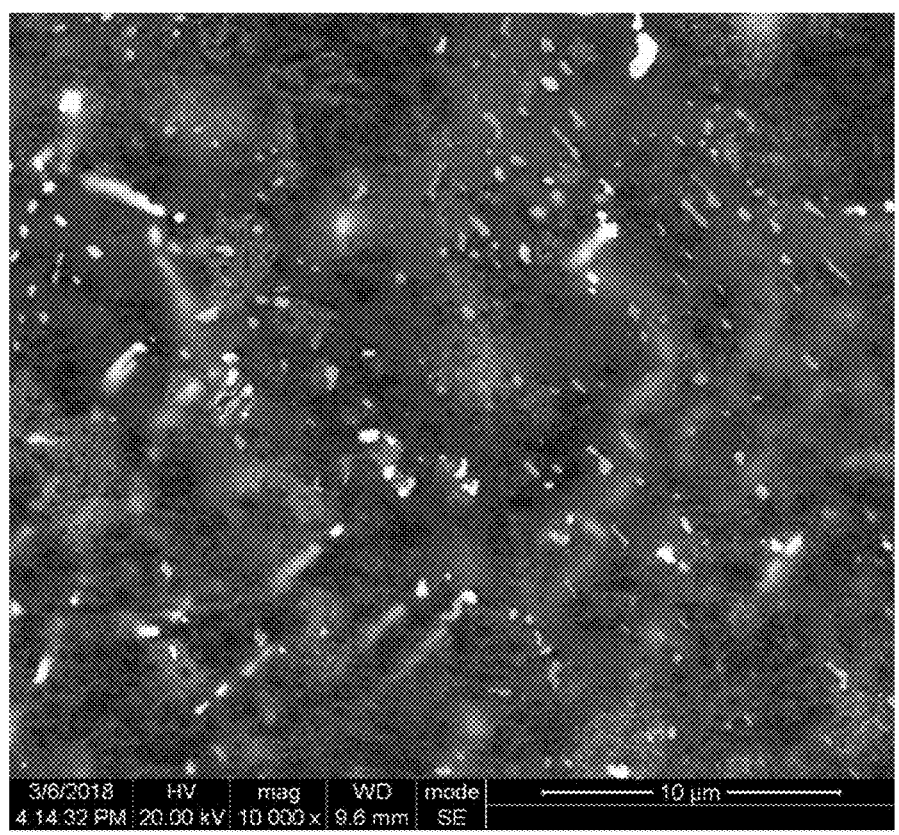
Figures 1, 8:
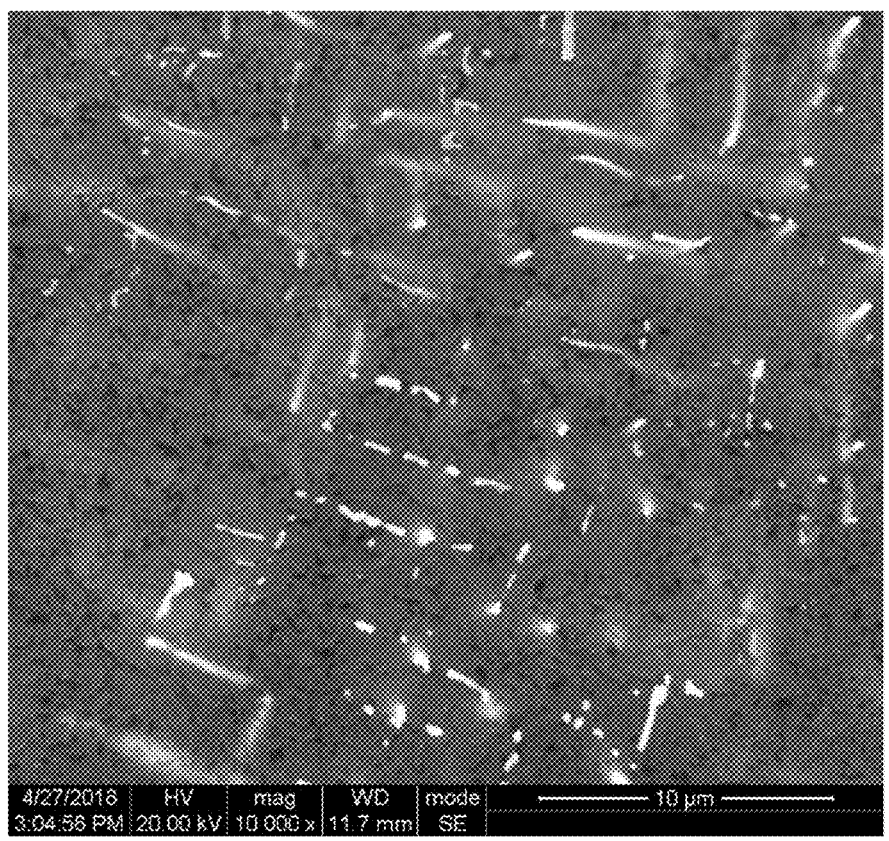
Figures 2, 8:
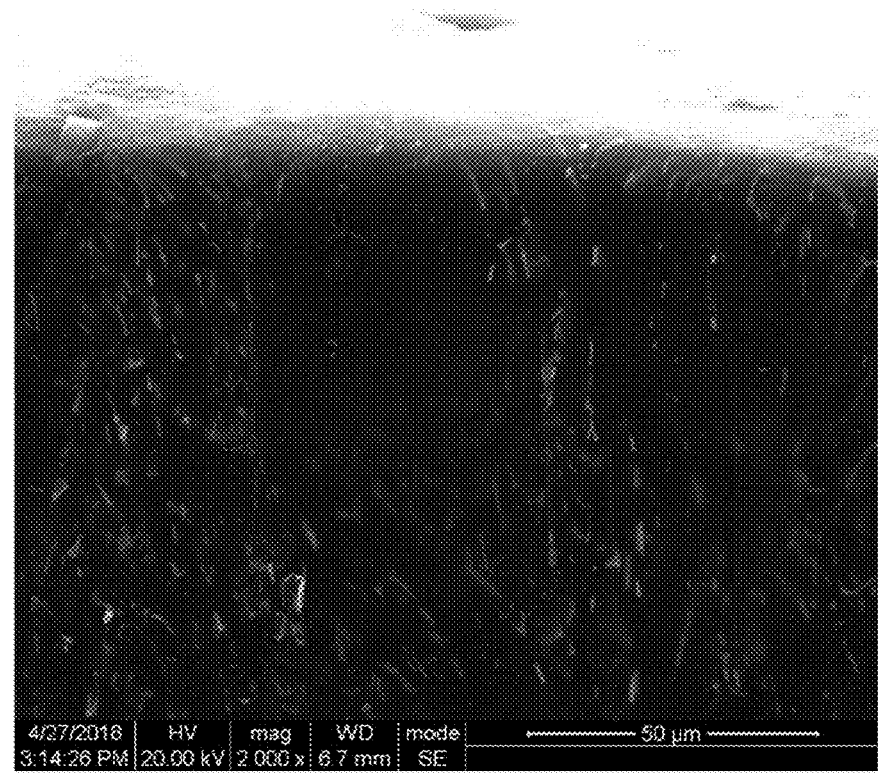
Figures 1, 9:
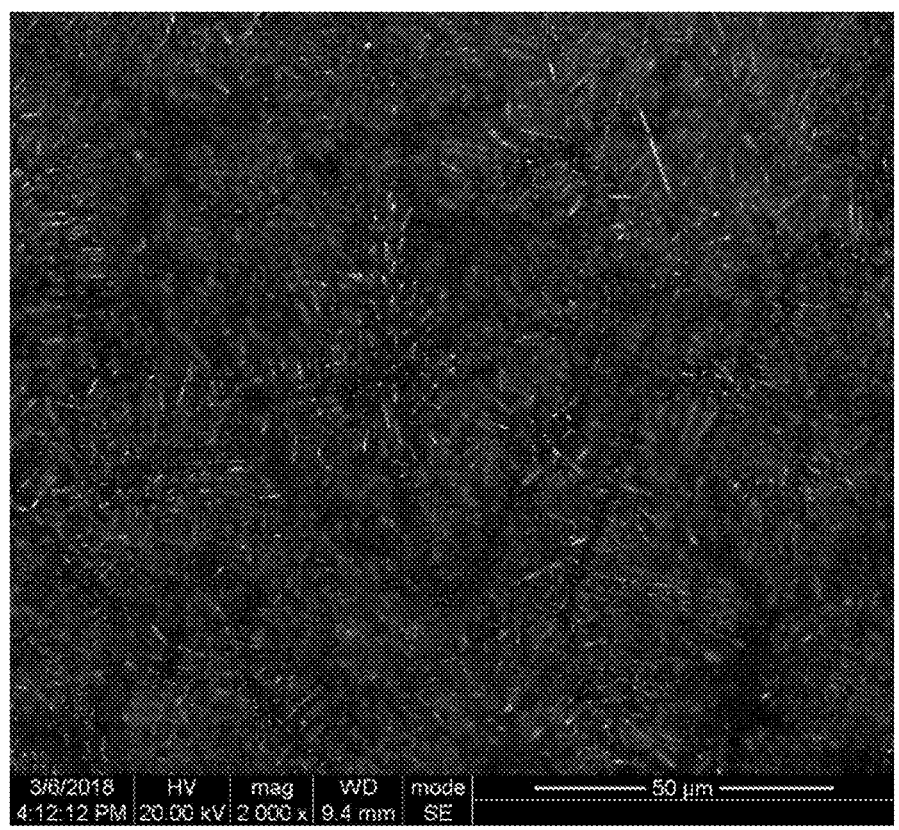
Figures 2, 9:
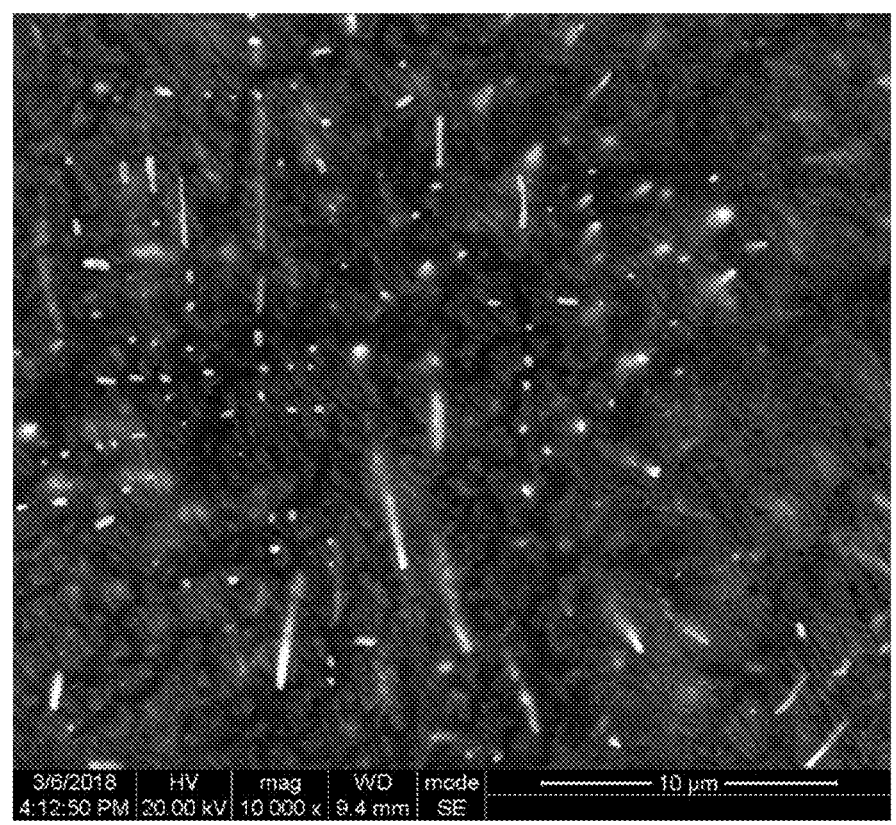
Figures 1, 10:
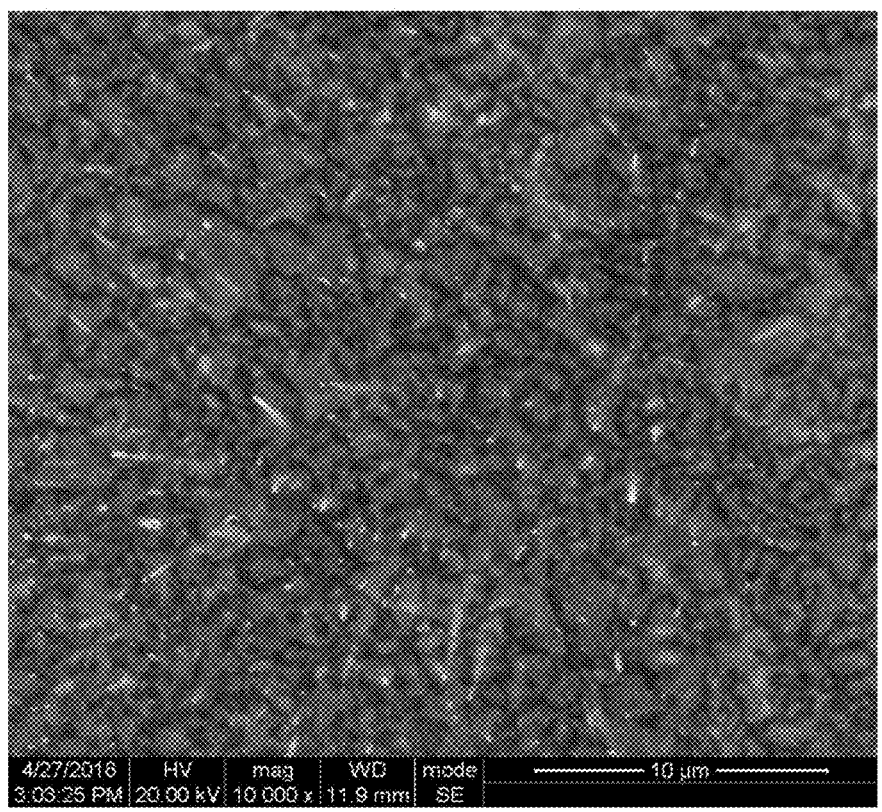
Figures 2, 10:
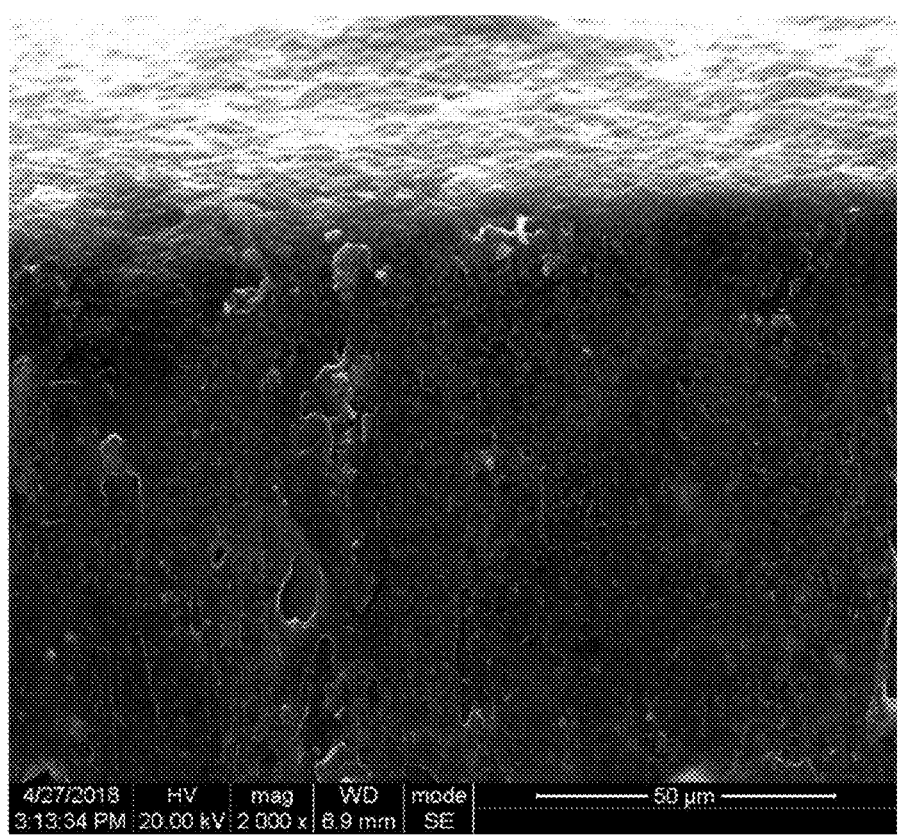
Figures 1, 11:
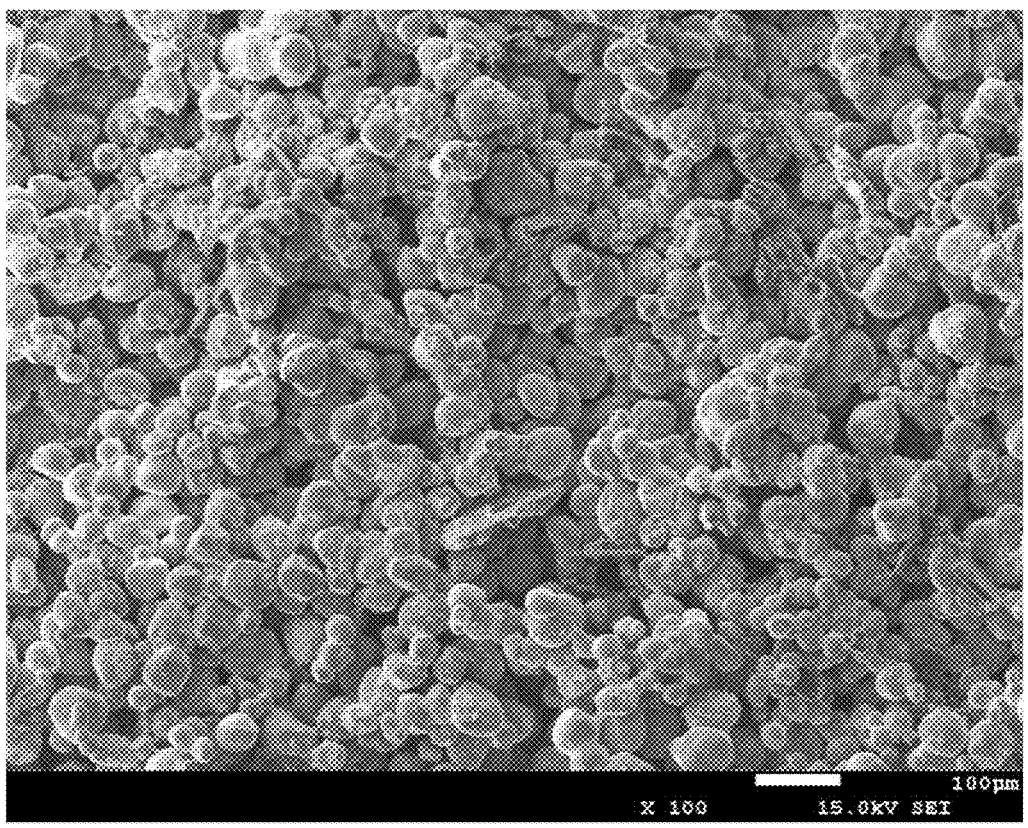
Figures 2, 11:
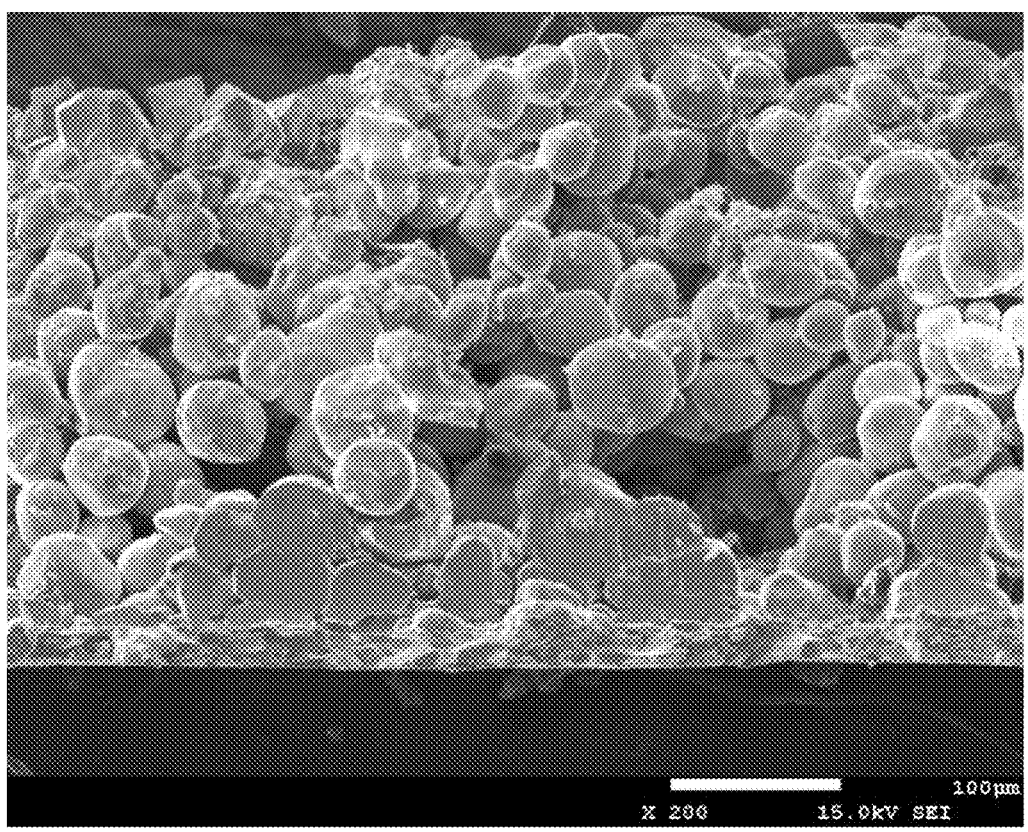

In appearance, the copper nanowires contained in the lithium-copper alloy CuLi60 as the anode material obtained in embodiment 4 are more dispersed, more uniform, and have more regular morphologies than those in embodiments 1-3. FIG. 2-1 and FIG. 2-2 show the SEM images of the lithium-copper alloy obtained in embodiment 4. As can be seen from FIG. 2-1 and FIG. 2-2, the copper nanowires are uniformly dispersed inside the lithium-copper alloy, and the copper nanowire structure obtained after lithium is dissolved has a relatively large specific surface area.

Figures 1, 12:
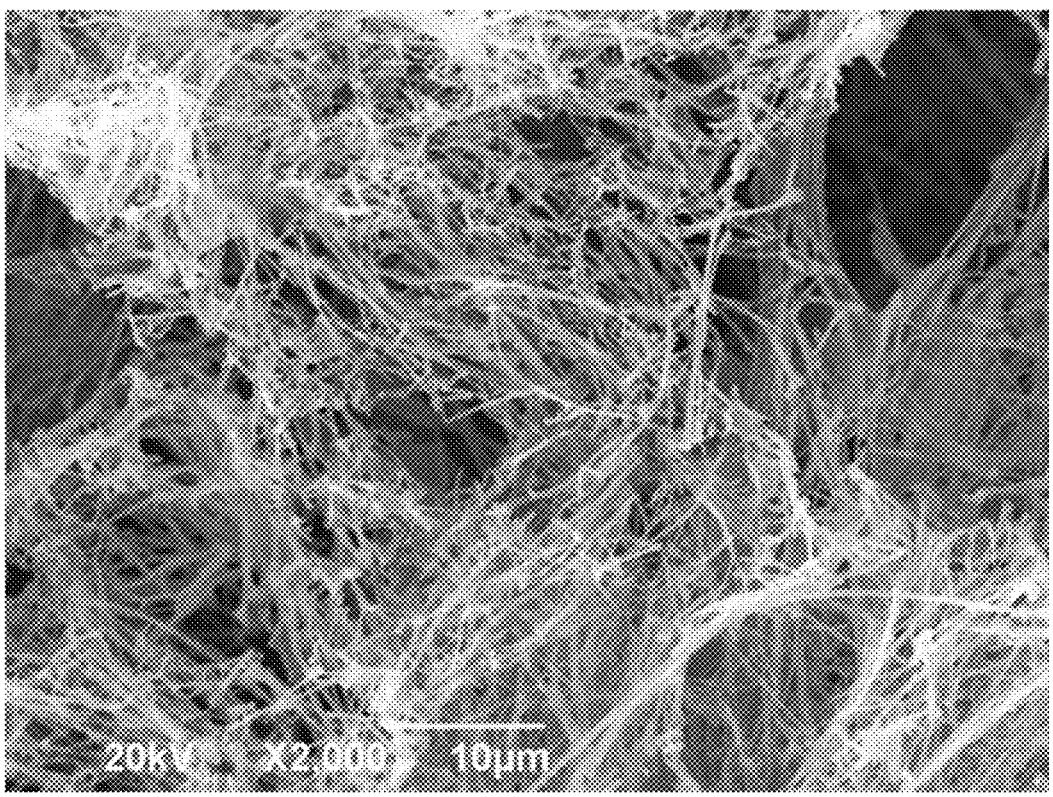
Figures 2, 12:
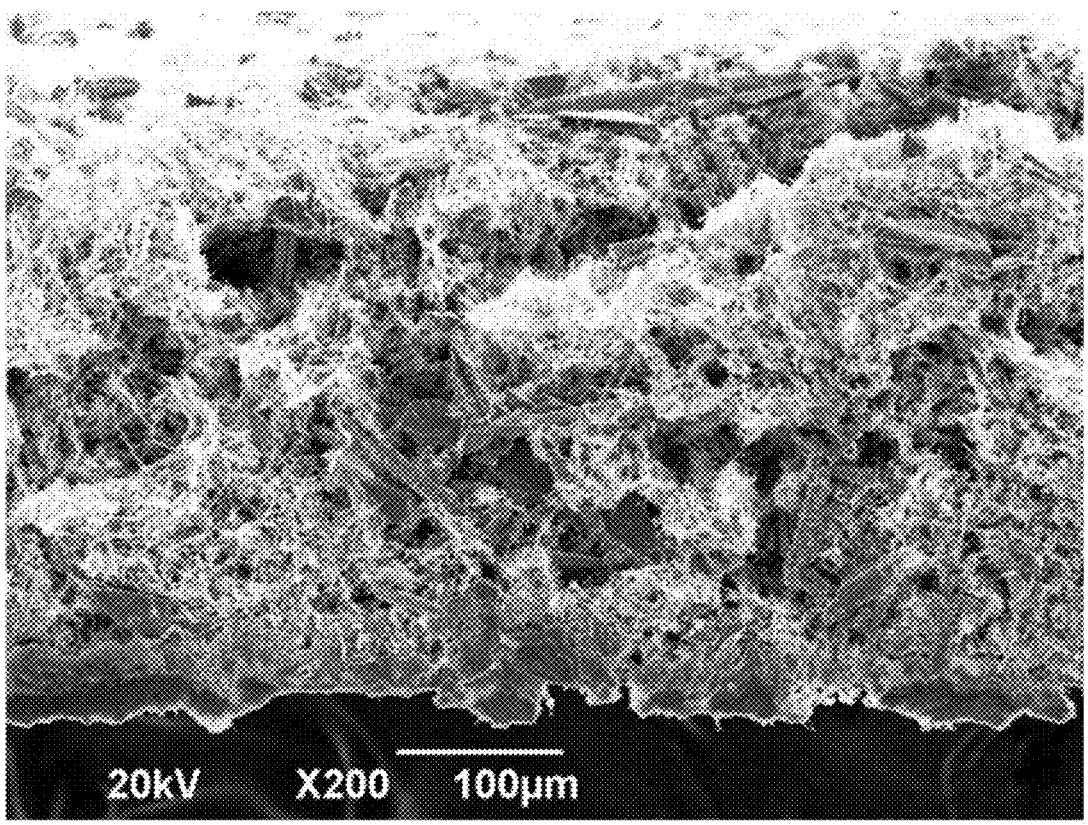

FIG. 12-1 and FIG. 12-2 show the observed result of the morphology of the lithium-copper alloy CuLi60 anode material obtained in embodiment 4 after lithium is removed. Among them, FIG. 12-1 is an SEM image showing the surface, and FIG. 12-2 is a SEM image showing the cross section. As can be seen from FIG. 12-1 and FIG. 12-2, the copper nanowires are uniformly dispersed inside the lithium-copper alloy as a skeleton structure.

Figure 13:
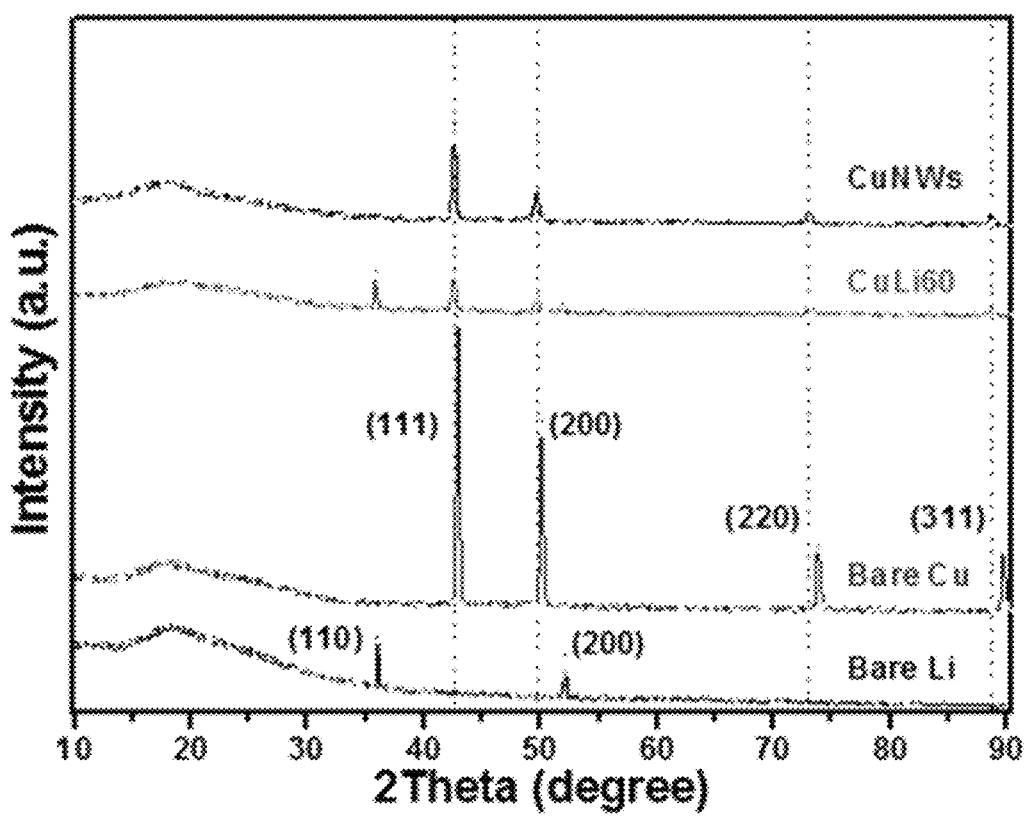
FIG. 13 shows an X-ray diffraction (XRD) pattern of the lithium-copper alloy CuLi60 before and after lithium is removed.

The crystal compositions of the lithium-copper alloy CuLi60 as the anode material obtained in embodiment 4 before and after lithium is removed are detected by X-ray diffraction (XRD), and the results are shown in FIG. 13. The lithium-copper alloy has copper crystals before and after lithium is removed, and also has characteristic diffraction peaks of lithium in the XRD pattern before lithium is removed.

The lithium-copper alloy CuLi60 as the anode material obtained in embodiment 4 has significant superiority in other properties compared to the lithium anode material before being modified, which is tested by following experimental examples.

EXPERIMENTAL EXAMPLE 1

The copper nanowire structure of the lithium-copper alloy CuLi60 obtained in embodiment 4 after lithium is removed is used in a lithium-copper battery system, and the lithium-copper battery is assembled in a glove box filled with argon without water and oxygen.

1 mol/L of LiTFSI and 2% $LiNO_3$ are dissolved in a mixture of DOL and DME as an electrolyte system, wherein a ratio of the DOL and DME is 1:1. A lithium foil with a diameter of 8 mm is used as an anode. A Celgard 2325 separator with a diameter of 19 mm is used. A copper nanowire structure/conventional copper foil with a diameter of 12 mm is used as a counter electrode. The electrolyte system, the lithium foil, the Celgard 2325 separator, and the copper nanowire structure/conventional copper foil are encapsulated in the CR2032 button battery for a constant current charge and discharge test. The test parameters are as follows. The current density is 1 $mA/cm^2$. The button battery is discharged for 1 hour, and then charged to 1 V. The result thereof is shown in FIG. 14.

Figure 14:
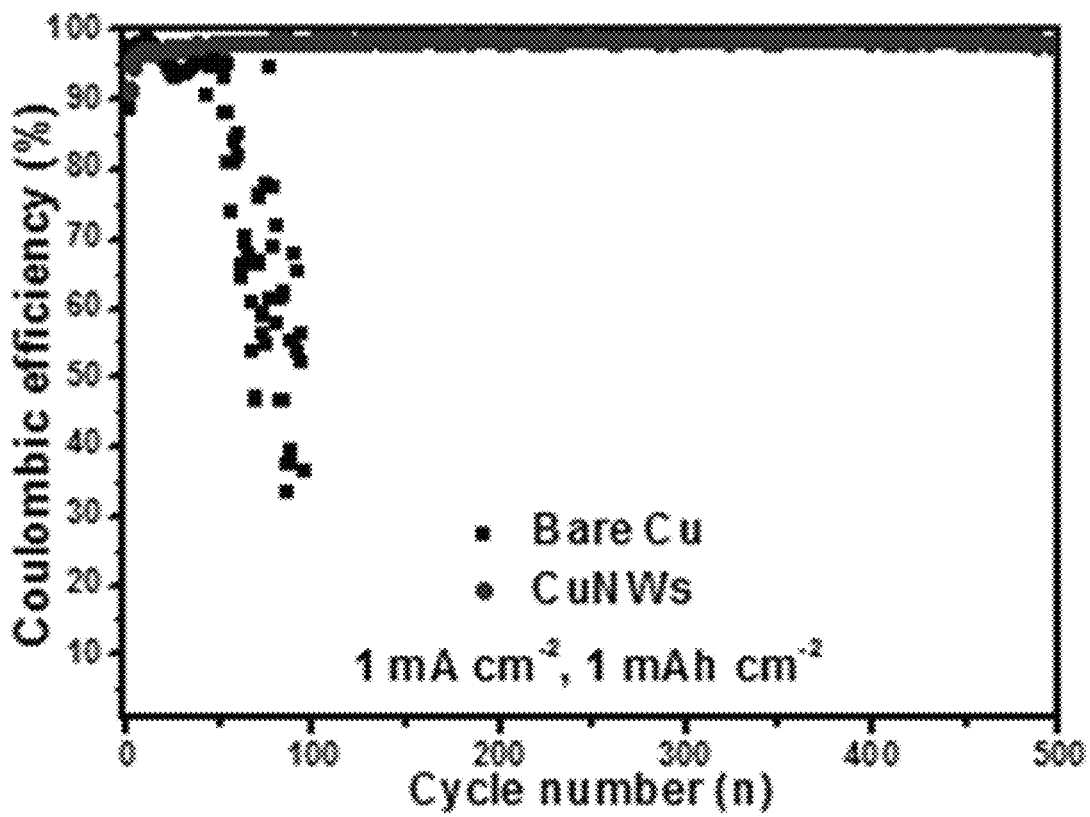
FIG. 14 is a graph showing the cycle efficiency of a Li—Cu battery using copper foil and copper nanowires of CuLi60 after lithium is removed, respectively, wherein the Li—Cu battery uses 1 mol/L of lithium bis(trifluoromethanesulfonyl)imide (LiTFSI)+2% of $LiNO_3$+(1,3-dioxolane (DOL):dimethoxyethane (DME)=1:1) as the electrolyte and has a current density of 1 mA/cm$^2$ according to experimental example 1.

As can be seen from FIG. 14, the battery has a low coulombic efficiency and short cycle lifespan when using conventional copper as the counter electrode. When the copper nanowire structure of the lithium-copper alloy CuLi60 obtained in embodiment 4 after lithium is removed is used as the counter electrode, the coulombic efficiency of the battery increases to approximately 100%, the cycle lifespan dramatically increases to 500 cycles, and the electrochemical impedance is small.

EXPERIMENTAL EXAMPLE 2

The lithium-copper alloy CuLi60 as the anode material obtained in embodiment 4 is used in a Li—Li battery system, and the Li—Li battery is assembled in a glove box filled with argon without water and oxygen.

1 mol/L of LiTFSI and 2% $LiNO_3$ are dissolved in a mixture of DOL and DME as an electrolyte system, wherein a ratio of the DOL and DME is 1:1. The lithium-copper alloy CuLi60 with a diameter of 15 mm is used as an anode. A Celgard 2325 separator with a diameter of 19 mm is used. The lithium-copper alloy CuLi60/lithium foil with a diameter of 15 mm is used as a counter electrode. The electrolyte system, the lithium-copper alloy CuLi60, the Celgard 2325 separator, and the lithium-copper alloy CuLi60/lithium foil are encapsulated in the CR2032 button battery for a constant current charge and discharge test. The test parameters are as follows. The current density is 2 $mA/cm^2$. The button battery is charged for 1 hour and discharged for 1 hour. The result thereof is shown in FIG. 15.

Figure 15:
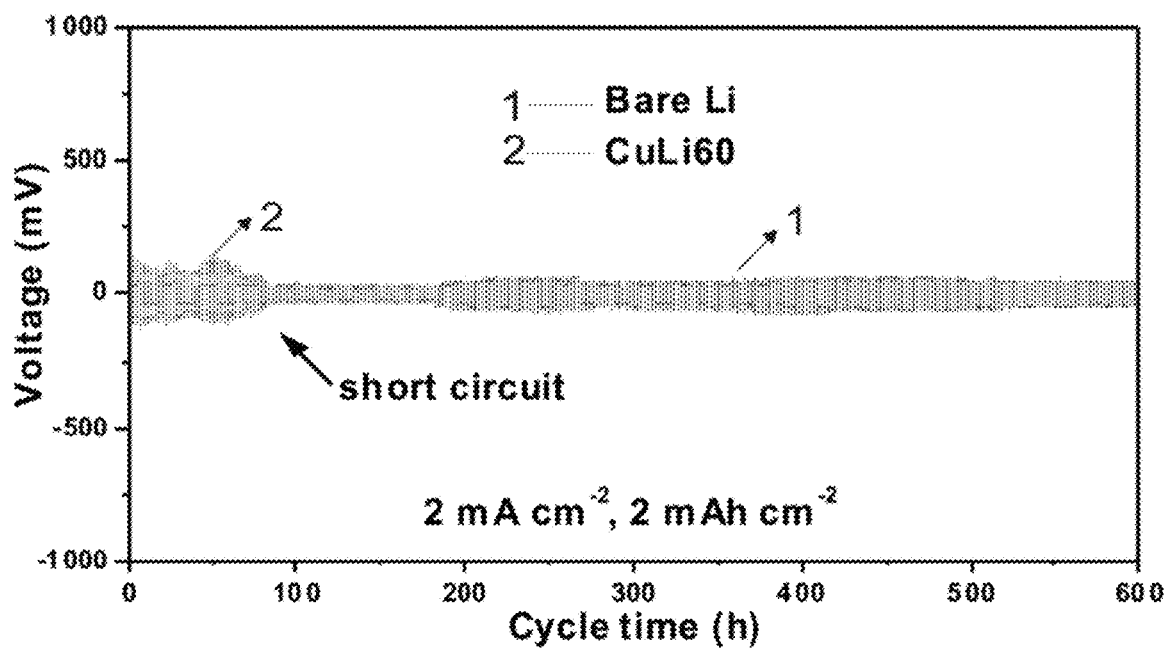
FIG. 15 is a graph showing the charge and discharge process of a Li—Li battery using lithium foil and CuLi60, respectively, wherein the Li—Li battery uses 1 mol/L of LiTFSI+2% of $LiNO_3$+(DOL:DME=1:1) as the electrolyte and has a current density of 2 mA/cm$^2$ according to experimental example 2.

As can be seen from FIG. 15, the battery assembled with the lithium foil is largely polarized due to a large charge transfer impedance. Moreover, the polarization of the battery significantly increases as the cycle time increases. This shows that the electrolyte is continuously consumed by the lithium metal during the operation process, resulting in the continuously increasing impedance. Finally, lithium dendrites pass through the separator to cause an internal short circuit, as a result, the voltage suddenly decreases. Compared with the battery assembled with the lithium foil, the battery assembled with the lithium-copper alloy CuLi60 has a less polarization, and the increase of the polarization with the cycle time increasing is less. This shows that the composite lithium metal after being modified has small charge transfer impedance, and can effectively inhibit the reaction between the lithium metal and the electrolyte. Also, the cycle lifespan is dramatically increased to more than 600 hours.

EXPERIMENTAL EXAMPLE 3

The lithium-copper alloy CuLi60 as the anode material obtained in embodiment 4 is used in a Li-LCO battery system, and the Li-LCO battery is assembled in a glove box filled with argon without water and oxygen.

1 mol/L of $LiPF_6$ is dissolved in a mixture of EC, DEC, and DMC as an electrolyte system, wherein a ratio of the EC, DEC, and DMC is 1:1:1. The lithium-copper alloy CuLi60 with a diameter of 15 mm is used as an anode. The Celgard 2325 separator with a diameter of 19 mm is used. A lithium cobalt oxide electrode with a diameter of 10 mm is used as a cathode. The electrolyte system, the lithium-copper alloy CuLi60, the Celgard 2325 separator, and the lithium cobalt oxide electrode are encapsulated in the CR2032 button battery for a constant current charge and discharge test at a charge rate of 1 C. The result thereof is shown in FIG. 16.

Figure 16:
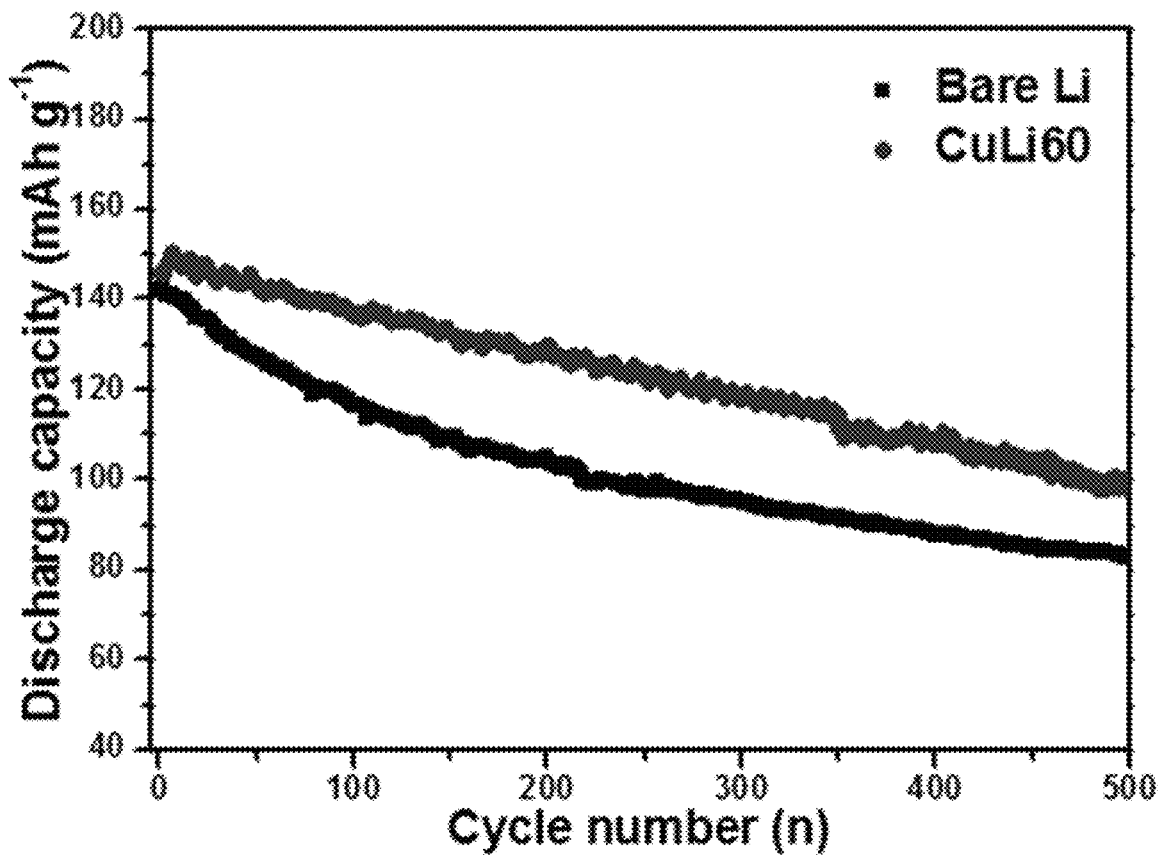
FIG. 16 is a graph showing the discharge capacity and coulombic efficiency of a Li-lithium cobalt oxide (LCO) battery using lithium foil and CuLi60, respectively, wherein the Li-LCO battery uses 1 mol/L of $LiPF_6$+(ethylene carbonate (EC):diethyl carbonate (DEC):dimethyl carbonate (DMC)=1:1:1) as the electrolyte and has a current density of 1 C according to experimental example 3.

As can be seen from FIG. 16, the discharge capacity of the battery assembled with the lithium-copper alloy CuLi60 is significantly higher than that of the battery assembled with the lithium foil, which proves that the modified lithium alloy anode significantly contributes to the improvement in the performance of the whole battery.

EXPERIMENTAL EXAMPLE 4

The lithium-copper alloy CuLi60 as the anode material obtained in embodiment 4 is used in a Li-LTO battery system, and the Li-LTO battery is assembled in a glove box filled with argon without water and oxygen.

1 mol/L of $LiPF_6$ is dissolved in a mixture of EC, DEC, and DMC as an electrolyte system, wherein a ratio of the EC, DEC, and DMC is 1:1:1. The lithium-copper alloy CuLi60 with a diameter of 15 mm is used as an anode. The Celgard 2325 separator with a diameter of 19 mm is used. A lithium titanium oxide electrode with a diameter of 10 mm is used as a cathode. The electrolyte system, the lithium-copper alloy CuLi60, the Celgard 2325 separator, and the lithium titanium oxide are encapsulated in the CR2032 button battery for a constant current charge and discharge test at a charge rate of 2 C. The result thereof is shown in FIG. 17.

Figure 17:
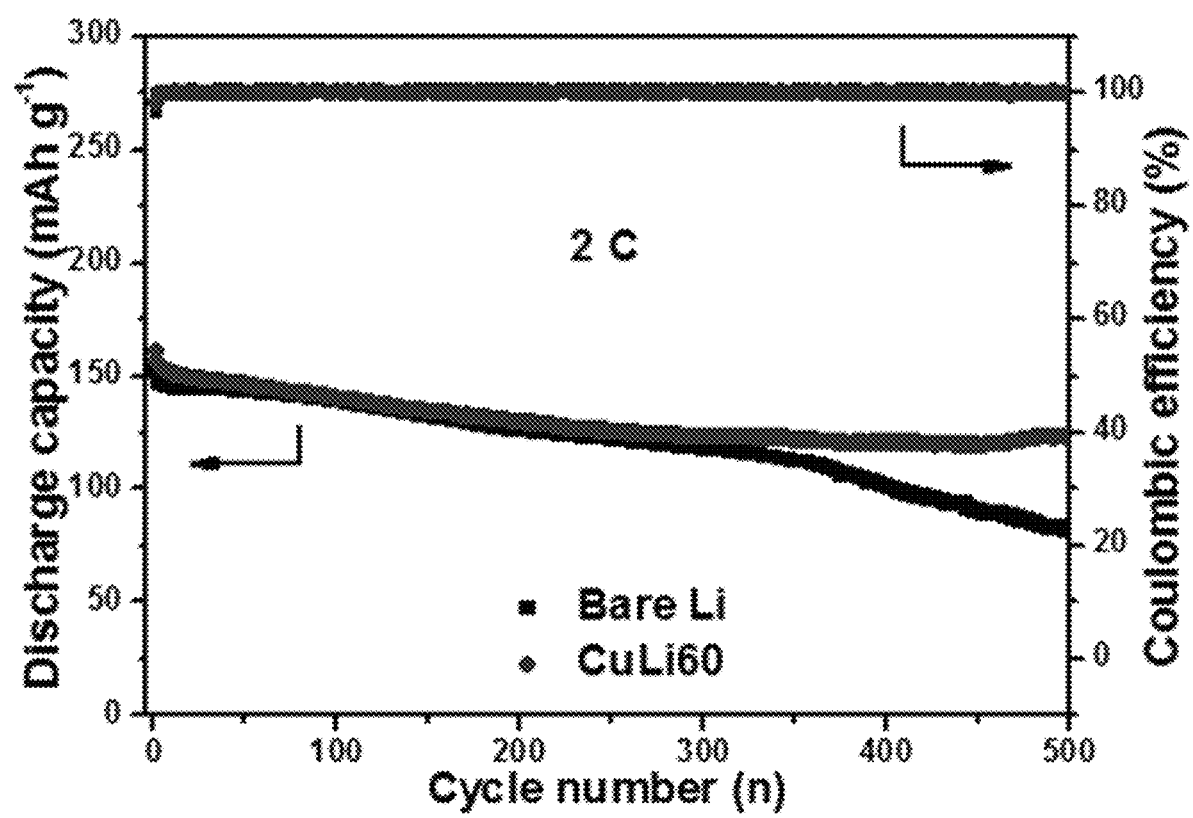
FIG. 17 is a graph showing the discharge capacity and coulombic efficiency of a Li-lithium titanium oxide (LTO) battery using lithium foil and CuLi60, respectively, wherein the Li-LTO battery uses 1 mol/L of $LiPF_6$+(EC:DEC:DMC=1:1:1) as the electrolyte and has a current density of 2 C according to experimental example 4.

As can be seen from FIG. 17, the capacity retention rate and discharge capacity of the battery assembled with the lithium-copper alloy CuLi60 are improved in comparison with the battery assembled with the lithium foil, which proves that the modified lithium alloy anode significantly contributes to the improvement in the performance of the whole battery.

What is claimed is:

1. A method for preparing a lithium alloy as an anode material, comprising the following steps:
   (1) heating a lithium metal to a temperature of 200° C.-800° C., wherein the temperature to which the lithium metal is heated is higher than a melting point of the lithium metal but lower than a melting point of a transition metal added in step (2), in an environment with a dew point not higher than −50° C. and an oxygen content not higher than 10 ppm to obtain a molten lithium metal;
   (2) adding the transition metal to the molten lithium metal at the temperature, maintaining the temperature for 5 minutes-15 minutes to make the transition metal dissolved to obtain a metal solution, and uniformly mixing the metal solution to form a molten alloy; wherein the transition metal is at least one selected from the group consisting of copper, nickel, scandium, titanium, vanadium, chromium, manganese, cobalt, and niobium, and wherein, an atomic ratio of the transition metal to the lithium metal is 1:100-2:3; and
   (3) cooling the molten alloy obtained in step (2) to room temperature to obtain the lithium alloy as the anode material, the lithium alloy containing transition metal nanowires forming a three-dimensional conductive network structure during said cooling,
   wherein the nanowires are uniformly dispersed inside the lithium alloy.

2. The method for preparing the lithium alloy as the anode material according to claim 1, wherein in step (1), the lithium metal is heated to 500° C. in the environment with the dew point of −55° C. and the oxygen content of 5 ppm.

3. The method for preparing the lithium alloy as the anode material according to claim 2, wherein the transition metal is copper.

4. The method for preparing the lithium alloy as the anode material according to claim 1, wherein the atomic ratio of the transition metal to the lithium metal is 1:60.

5. The method for preparing the lithium alloy as the anode material according to claim 4, wherein the transition metal is copper.

6. The method for preparing the lithium alloy as the anode material according to claim 1, wherein the transition metal is copper.

7. The method for preparing the lithium alloy as the anode material according to claim 1, wherein in step (3), the molten alloy obtained in step (2) is cooled to the room temperature within 5 minutes.

8. A lithium alloy as the anode material prepared by the method according to claim 1.

9. A lithium ion battery, comprising the lithium alloy as the anode material according to claim 8.

10. The lithium alloy as the anode material according to claim 8, wherein in step (1), the lithium metal is heated to 500° C. in the environment with the dew point of −55° C. and the oxygen content of 5 ppm.

11. The lithium alloy as the anode material according to claim 8, wherein the atomic ratio of the transition metal to the lithium metal is 1:60.

12. The lithium alloy as the anode material according to claim 8, wherein the transition metal is copper.

13. The lithium alloy as the anode material according to claim 8, wherein in step (3), the molten alloy obtained in step (2) is cooled to the room temperature within 5 minutes.

* * * * *